US011882066B2

(12) United States Patent
Manolakos et al.

(10) Patent No.: US 11,882,066 B2
(45) Date of Patent: Jan. 23, 2024

(54) SELECTIVE CANCELLATION OF ON-DEMAND POSITIONING REFERENCE SIGNAL (PRS) OCCASIONS

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/373,999

(22) Filed: Jul. 13, 2021

(65) Prior Publication Data
US 2022/0029763 A1  Jan. 27, 2022

Related U.S. Application Data

(60) Provisional application No. 63/057,272, filed on Jul. 27, 2020.

(51) Int. Cl.
*H04L 5/00* (2006.01)
*H04W 24/10* (2009.01)

(52) U.S. Cl.
CPC ........... *H04L 5/0048* (2013.01); *H04W 24/10* (2013.01)

(58) Field of Classification Search
CPC ... H04L 5/0048; H04L 5/0037; H04L 5/0091; H04L 5/0094; H04W 24/10; H04W 64/00
See application file for complete search history.

(56) References Cited

U.S. PATENT DOCUMENTS

| 2013/0267246 | A1 | 10/2013 | Wang et al. | |
| 2021/0288773 | A1* | 9/2021 | Lin | H04W 56/001 |
| 2022/0132463 | A1* | 4/2022 | Cha | H04B 17/27 |
| 2023/0156656 | A1* | 5/2023 | Si | H04L 5/0098 |
| | | | | 455/450 |

FOREIGN PATENT DOCUMENTS

| EP | 2666319 A1 | 11/2013 |
| EP | 3154295 A1 | 4/2017 |
| WO | 2020091660 A1 | 5/2020 |
| WO | 2020145727 A1 | 7/2020 |

OTHER PUBLICATIONS

International Search Report and Written Opinion—PCT/US2021/041549—ISA/EPO—dated Oct. 28, 2021.

* cited by examiner

*Primary Examiner* — Justin T Van Roie
(74) *Attorney, Agent, or Firm* — QUALCOMM Incorporated

(57) ABSTRACT

Disclosed are various techniques for wireless communication. In an aspect, a user equipment (UE) receives, from a network entity, a positioning reference signal (PRS) configuration. The UE receives, from a serving base station, a measurement gap (MG) configuration. The UE determines that one or more transmission properties of one or more resources should be modified and transmits PRS modification information to the network entity based on the one or more transmission properties of one or more PRS resources to be modified. The network entity may be a location server or location management function.

42 Claims, 16 Drawing Sheets

SELECTIVE CANCELLATION OF ON-DEMAND POSITIONING REFERENCE SIGNAL (PRS) OCCASIONS

CROSS-REFERENCE TO RELATED APPLICATION

This application claims priority to U.S. Provisional Patent Application No. 63/057,272, filed Jul. 27, 2020, entitled "SELECTIVE CANCELLATION OF ON-DEMAND POSITIONING REFERENCE SIGNAL (PRS) OCCASIONS," which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving, from a network entity, a positioning reference signal (PRS) configuration; receiving, from a serving base station, a measurement gap (MG) configuration; determining that one or more transmission properties of one or more PRS resources should be modified; and transmitting PRS modification information to the network entity, based on the one or more transmission properties of one or more PRS resources to be modified.

In an aspect, a method of wireless communication performed by a network entity includes transmitting, to a user equipment (UE), a positioning reference signal (PRS) configuration; receiving, from the UE, PRS modification information; updating the PRS configuration for the UE based on the PRS modification information; and transmitting, to the UE, the updated PRS configuration.

In an aspect, a user equipment (UE) includes a memory; at least one transceiver; and at least one processor communicatively coupled to the memory and the at least one transceiver, the at least one processor configured to: receive, from a network entity, a positioning reference signal (PRS) configuration; receive, from a serving base station, a measurement gap (MG) configuration; determine that one or more transmission properties of one or more PRS resources should be modified; and cause the at least one transceiver to transmit PRS modification information to the network entity, based on the one or more transmission properties of one or more PRS resources to be modified.

In an aspect, a network entity includes a memory; at least one network interface; and at least one processor communicatively coupled to the memory and the at least one network interface, the at least one processor configured to: cause the at least one network interface to transmit, to a user equipment (UE), a positioning reference signal (PRS) configuration; receive, from the UE, PRS modification information; update the PRS configuration for the UE based on the PRS modification information; and cause the at least one network interface to transmit, to the UE, the updated PRS configuration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
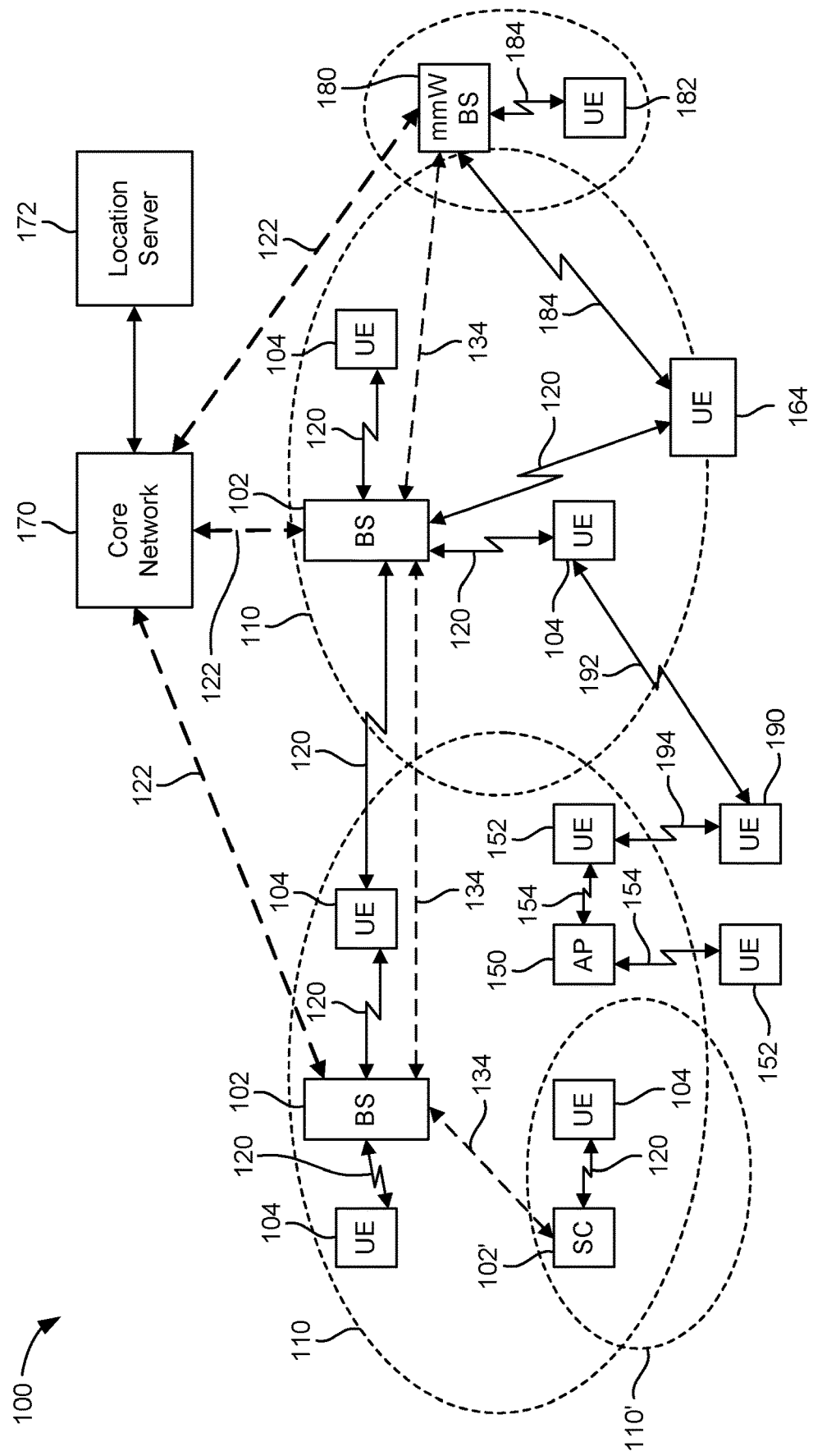
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (UT), a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an exemplary wireless communications system 100 according to various aspects. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
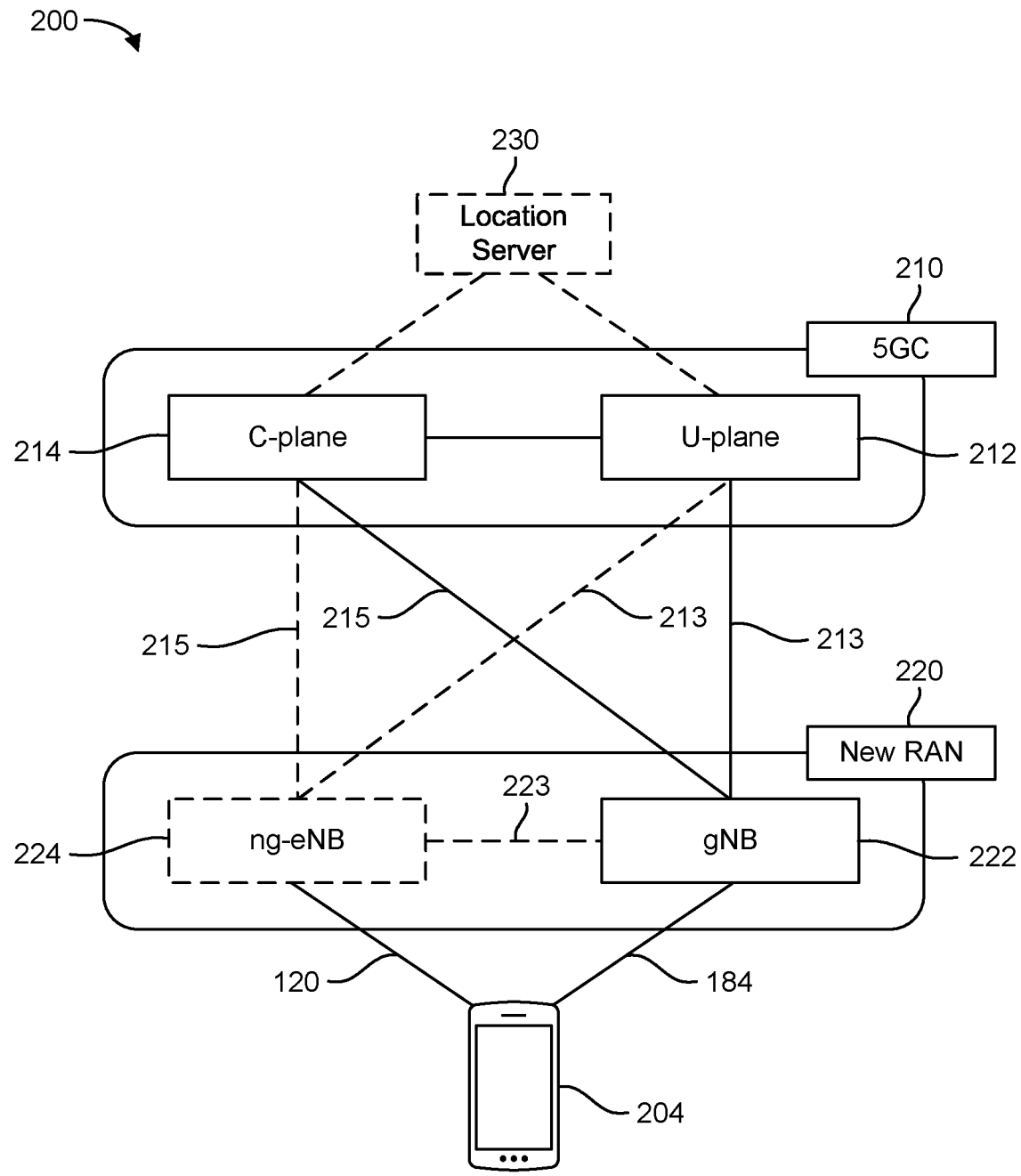
FIGS. 2A and 2B illustrate example wireless network structures, according to various aspects.

FIG. 2A illustrates an example wireless network structure 200 according to various aspects. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include a location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
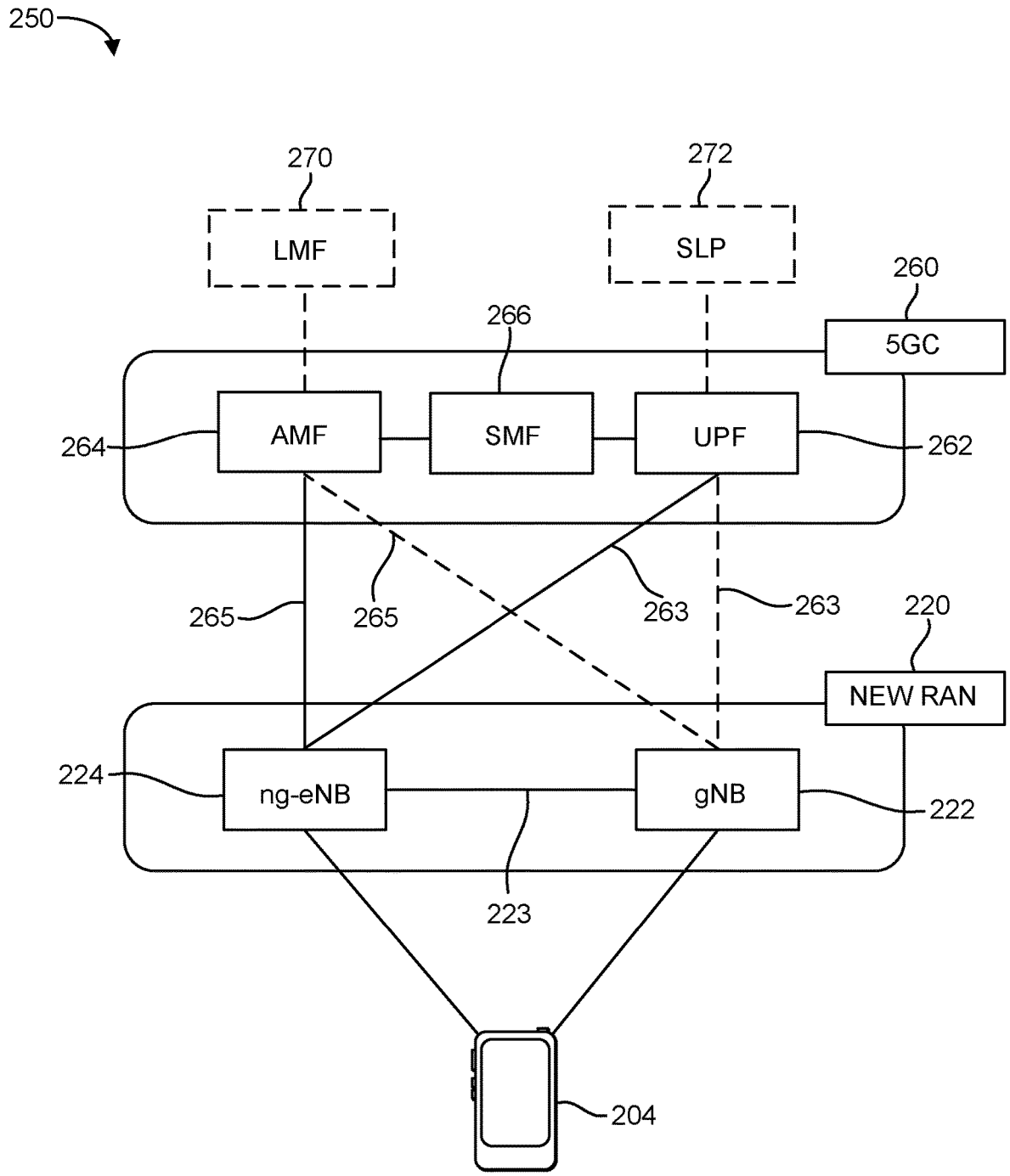

FIG. 2B illustrates another example wireless network structure 250 according to various aspects. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a location management component (LMC). However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
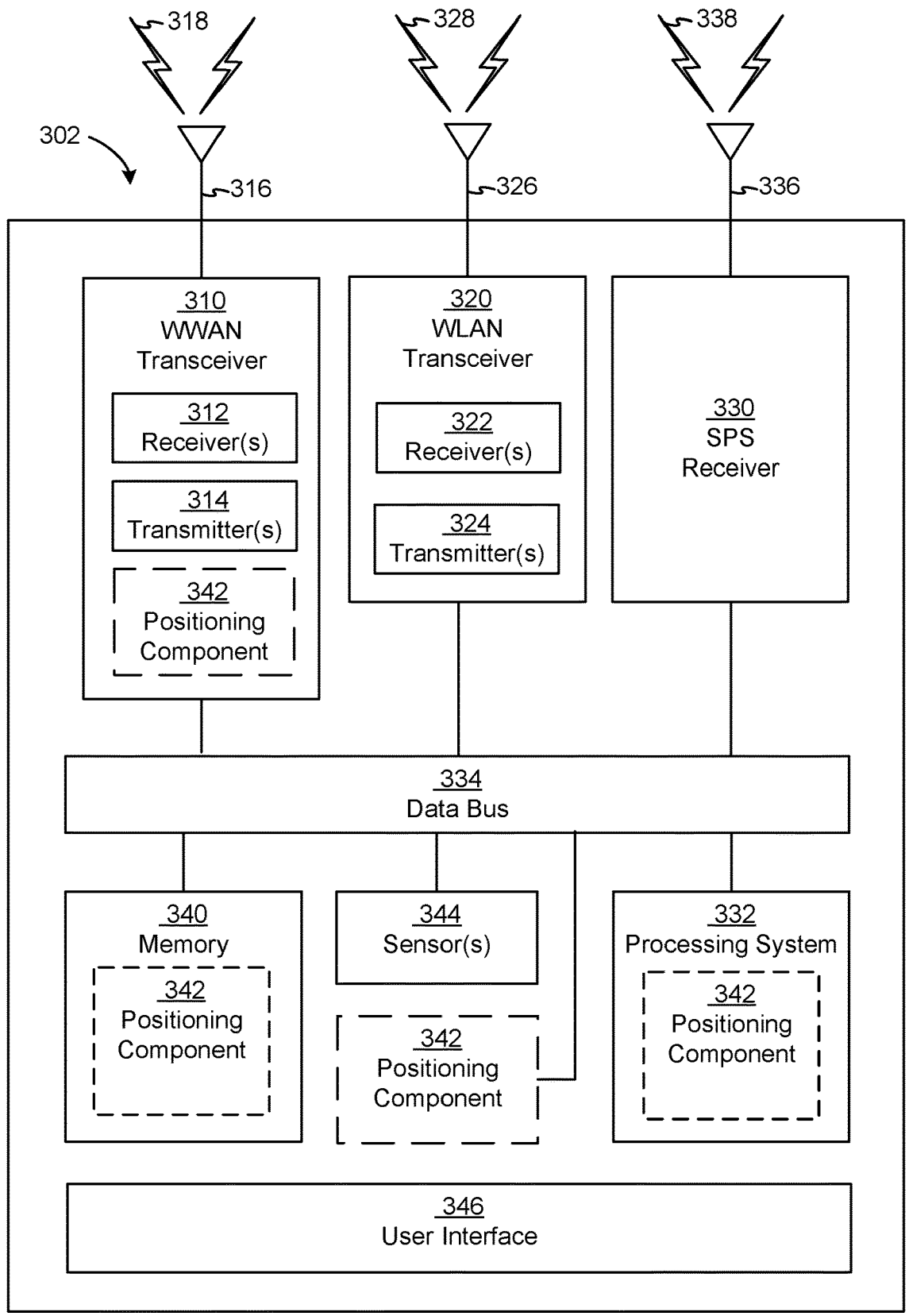
FIGS. 3A to 3C are simplified block diagrams of several sample aspects of components that may be employed in wireless communication nodes and configured to support communication according to various aspects.
Figure 3B:
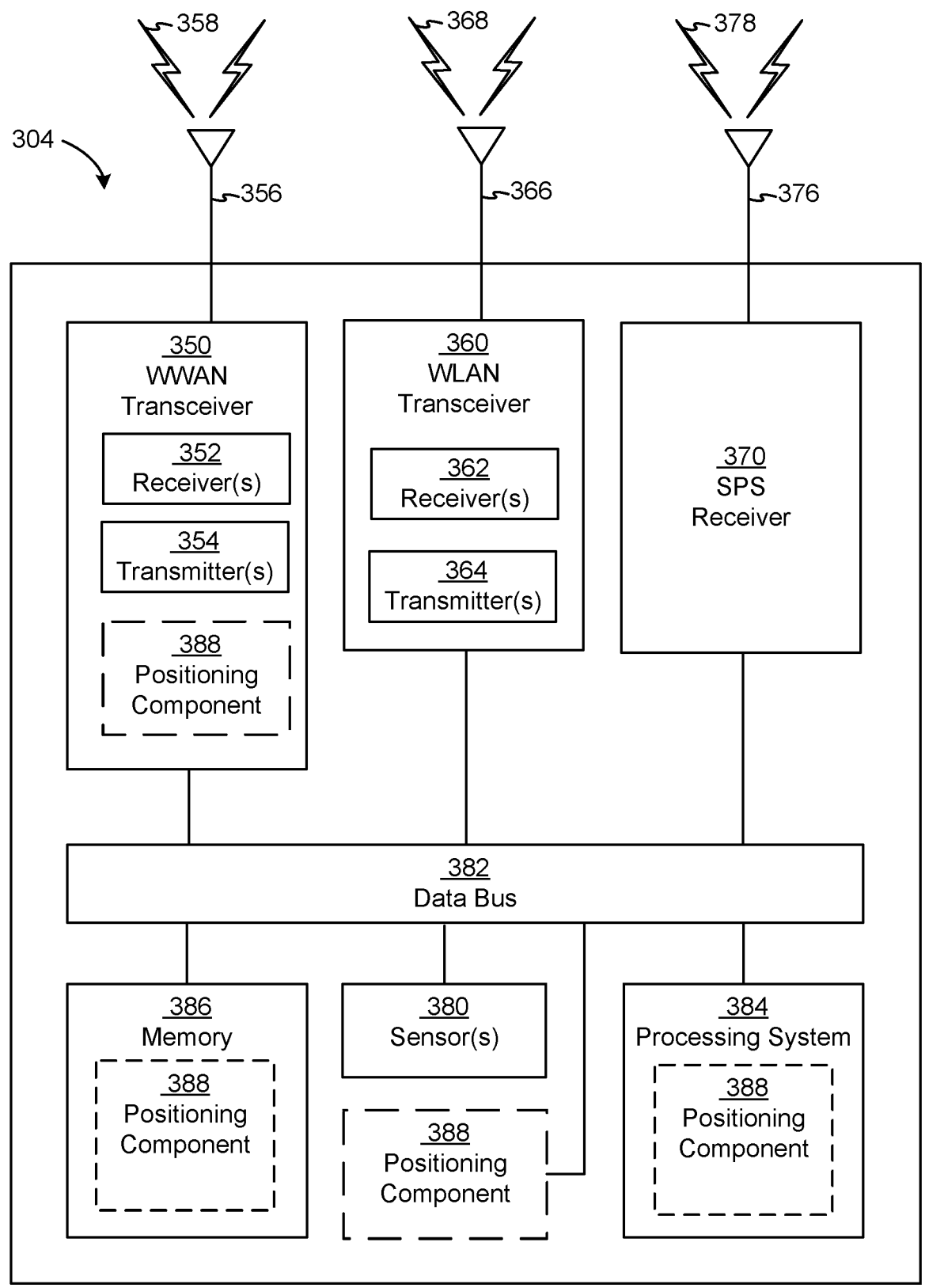
Figure 3C:
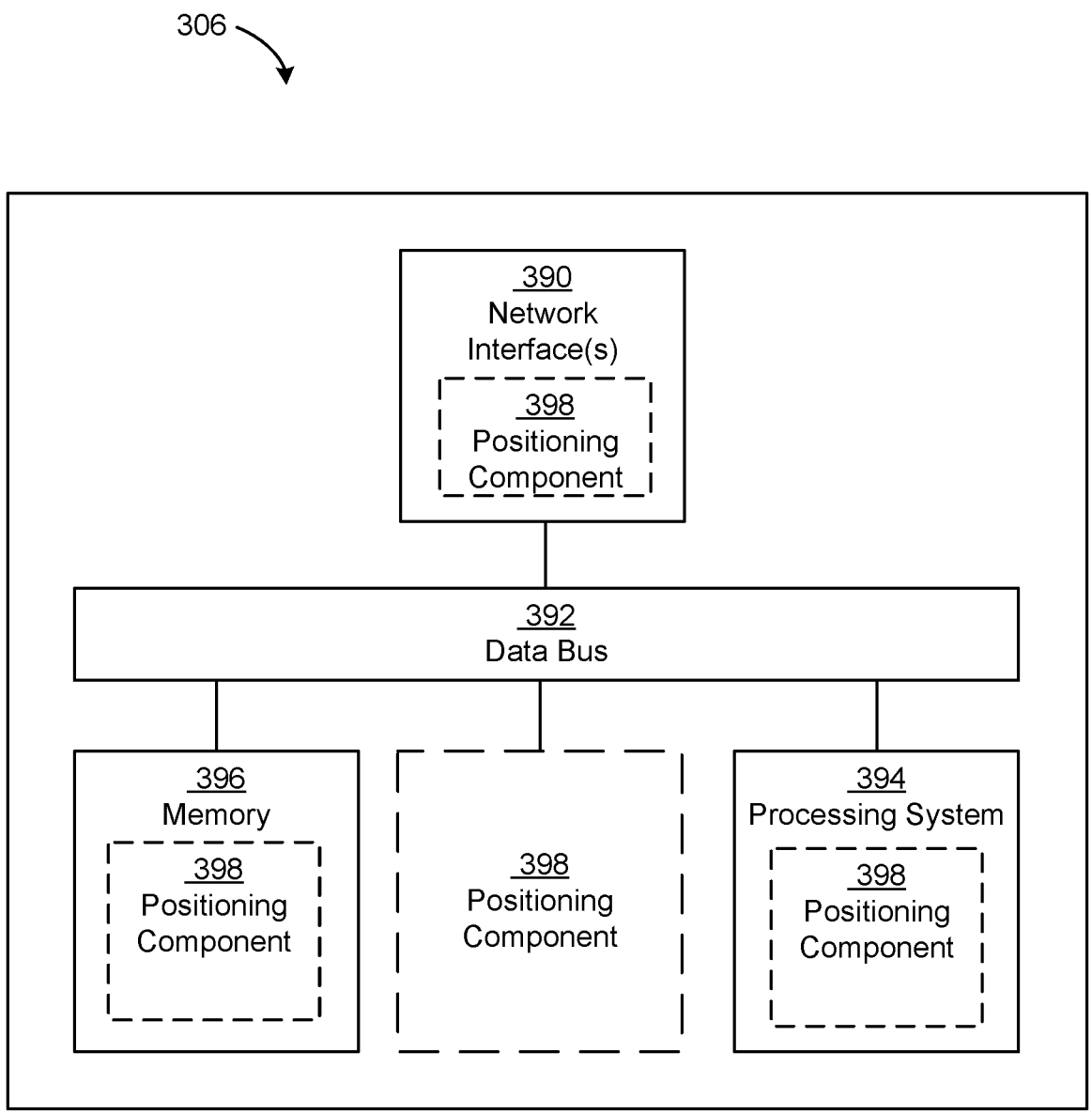

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and perform calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a UE measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Various frame structures may be used to support downlink and uplink transmissions between network nodes (e.g., base stations and UEs).

Figure 4A:
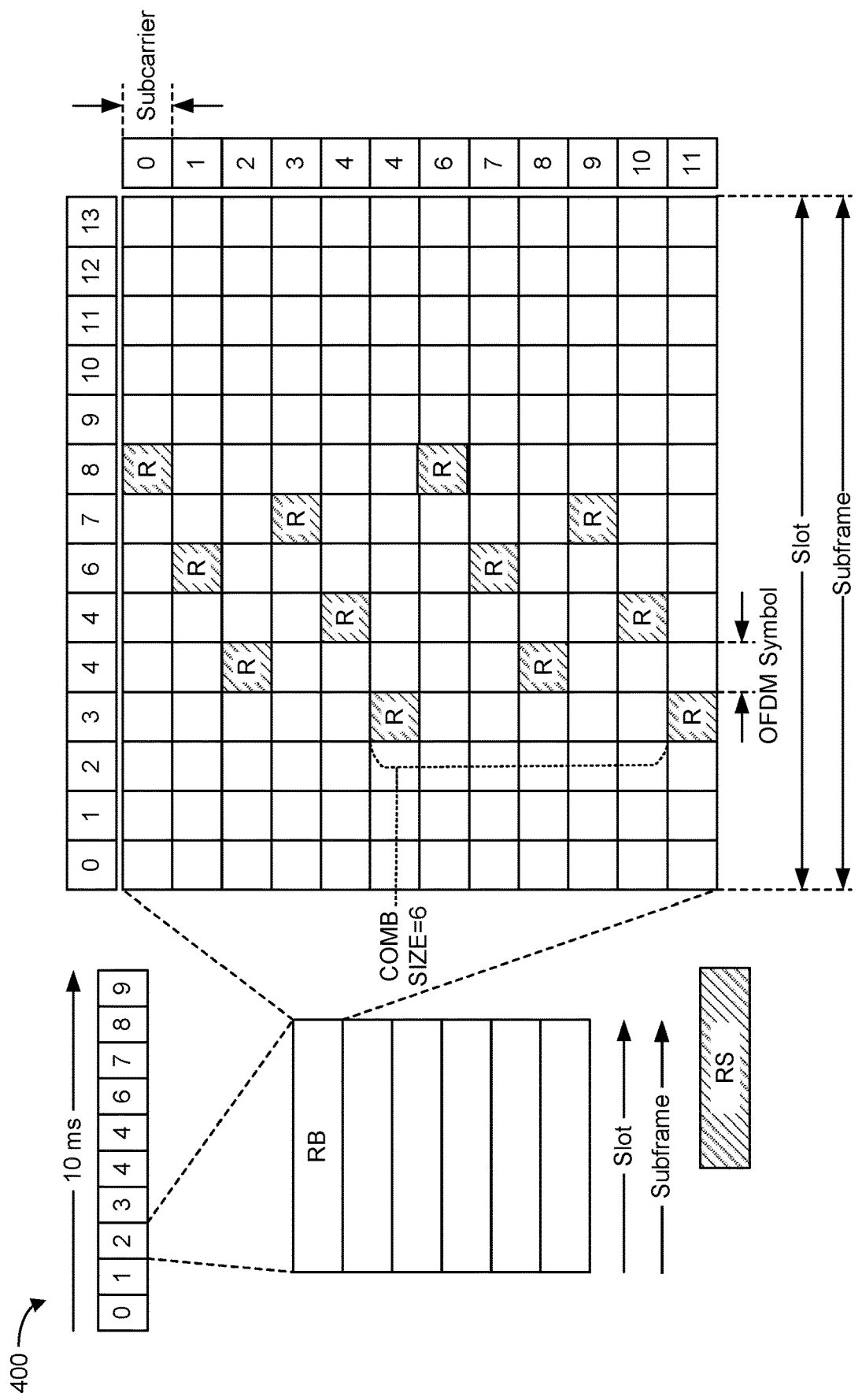
FIGS. 4A and 4B are diagrams illustrating example frame structures and channels within the frame structures, according to various aspects.

FIG. 4A is a diagram 400 illustrating an example of a downlink frame structure, according to aspects of the disclosure.

Figure 4B:
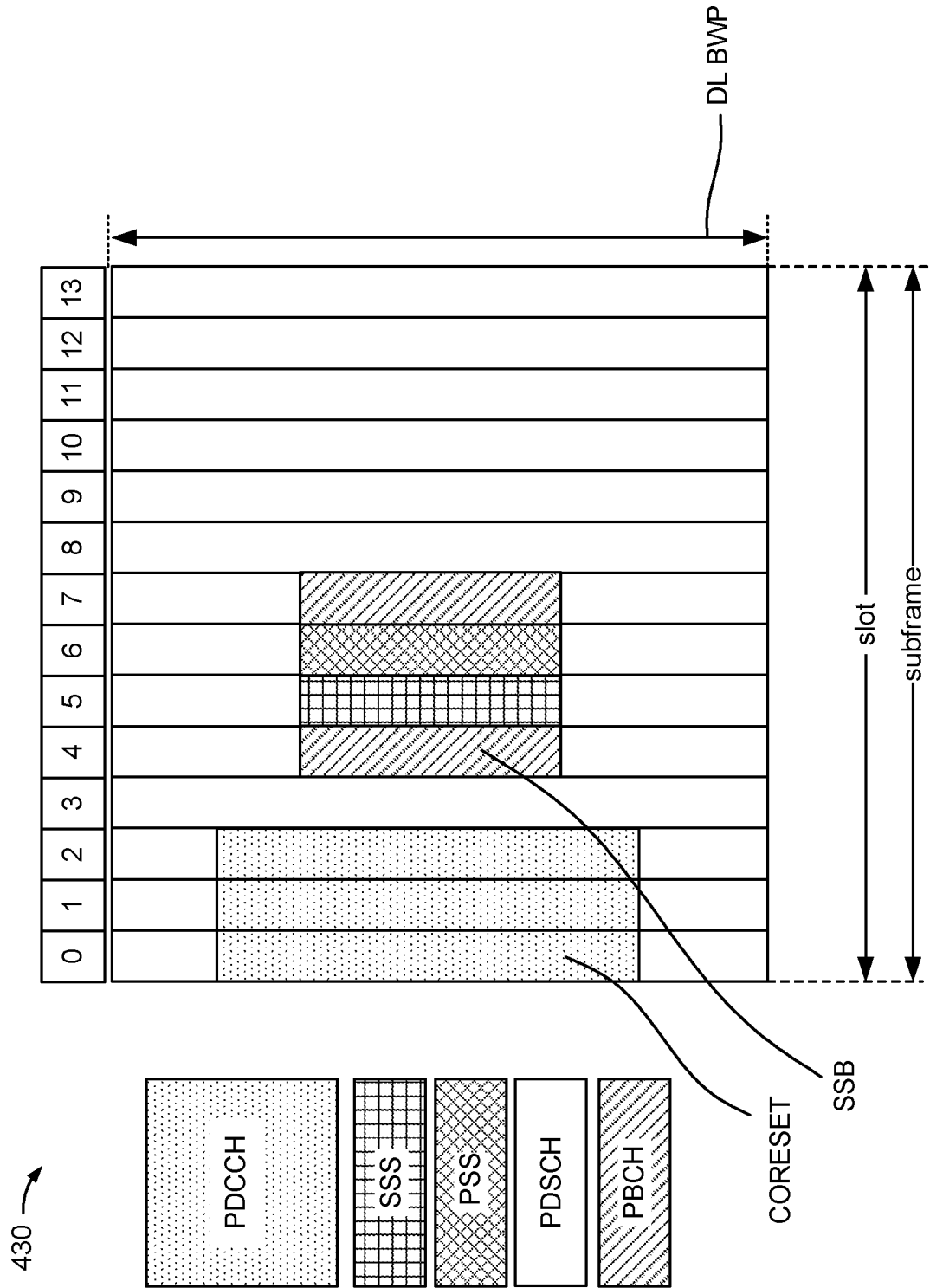

FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 504, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (0, for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Sot | Slots/ Sub-frame | Slots / Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In NR, a subframe is 1 ms in duration, a slot is fourteen symbols in the time domain, and an RB contains twelve consecutive subcarriers in the frequency domain and fourteen consecutive symbols in the time domain. Thus, in NR there is one RB per slot. Depending on the SCS, an NR subframe may have fourteen symbols, twenty-eight symbols, or more, and thus may have 1 slot, 2 slots, or more. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates exemplary locations of REs carrying PRS (labeled "R").

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu} \cdot \{4, 5, 8, 10, 16, 20, 32, 40, 64, 80, 160, 320, 640, 1280, 2560, 5040, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Figure 5:
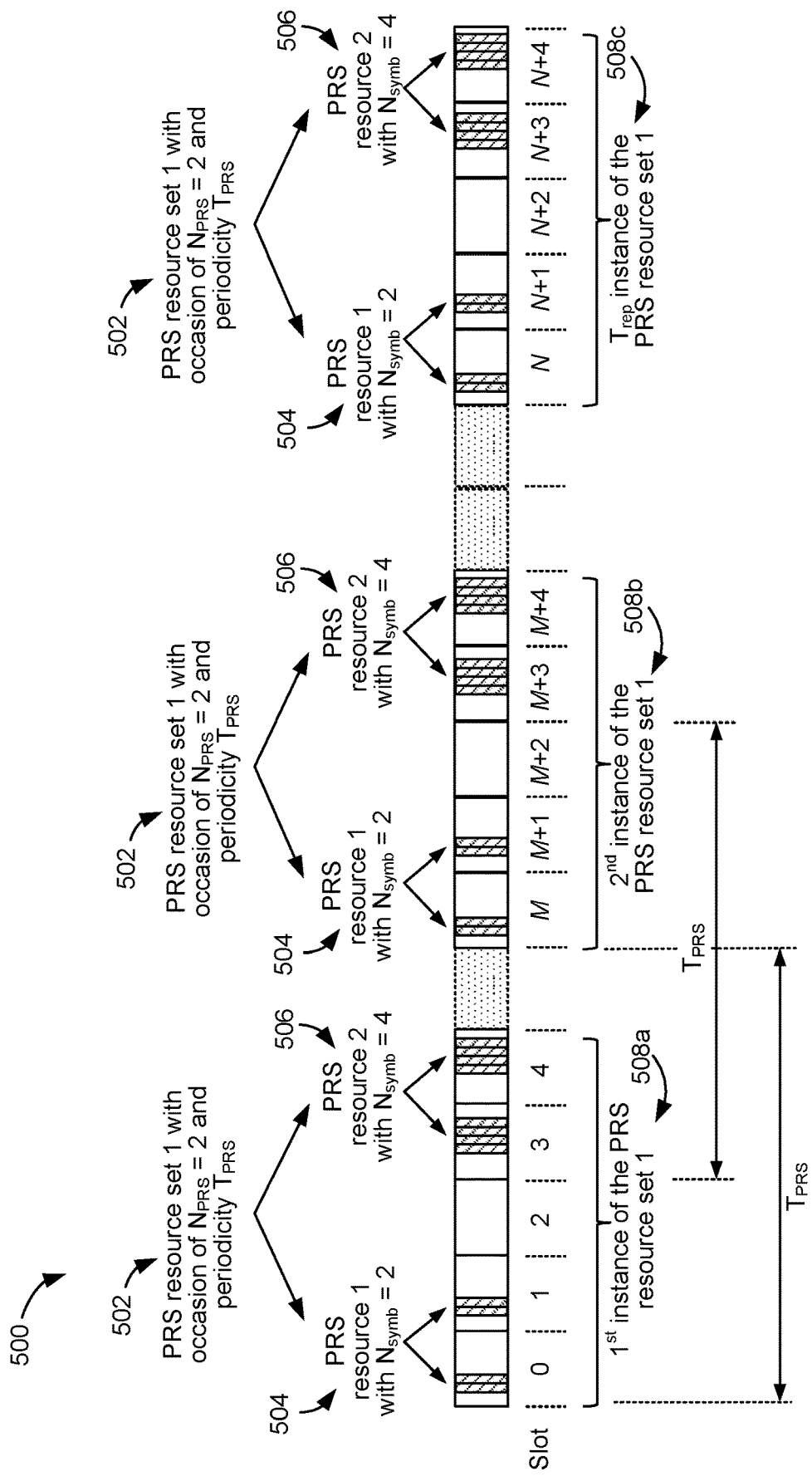
FIG. 5 is a diagram of an exemplary positioning reference signal (PRS) configuration for the PRS transmissions of a given base station, according to various aspects.

FIG. 5 is a diagram of an exemplary PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. The PRS configuration 500 defines a resource set 502 by identifying the PRS resources 504 and 506 during which the base station transmits PRS. The PRS resource set 504 has an occasion length $N_{PRS}$ of two (2) slots and a periodicity of $T_{PRS}$ (e.g., 160 subframes or 160 ms). As such, both the PRS resources 504 and 506 are two consecutive slots in length and repeat every $T_{PRS}$ subframes, starting from the slot in which the first symbol of the respective PRS resource occurs.

In the example of FIG. 5, the PRS resource set 502 includes two PRS resources, a first PRS resource 504 (labeled "PRS resource 1" in FIG. 5) and a second PRS resource 506 (labeled "PRS resource 2" in FIG. 5). The PRS resource 504 and the PRS resource 506 may be transmitted on separate beams of the same base station. The PRS resource 504 has a symbol length $N_{symb}$ of two (2) symbols, and the PRS resource 506 has a symbol length $N_{symb}$ of four (4) symbols.

Each instance of the PRS resource set 502, illustrated as instances 508a, 508b, and 508c, includes an occasion of length '2' (i.e., $N_{PRS}$=2) for each PRS resource 504, 506 of the PRS resource set. The PRS resources 504 and 506 are repeated every $T_{PRS}$ subframes up to the muting sequence periodicity $T_{REP}$. As such, a bitmap of length $T_{REP}$ would be needed to indicate which occasions of instances 508a, 508b, and 508c are muted.

In an aspect, there may be additional constraints on a PRS configuration, such as PRS configuration 500 illustrated in FIG. 5. For example, for all PRS resources (e.g., PRS resources 504, 506) of a PRS resource set (e.g., PRS resource set 502), the base station can configure the following parameters to be the same: (a) the occasion length (e.g., $T_{PRS}$), (b) the number of symbols (e.g., $N_{symb}$), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

There is one type of measurement gap in NR, meaning the same type of measurement gap is to be used for both radio resource management (RRM) measurements (i.e., the measurements needed for an RRM report) and PRS measurements. A measurement gap is a configured period of time during which the serving cell refrains from transmitting to the UE so that the UE can receive transmissions (e.g., downlink reference signals) from other cells. The transmissions from the other cells may or may not be on the same frequency as the serving cell. In addition to downlink reception, measurement gaps may also be utilized for uplink transmissions, including uplink reference signals such as SRS. It is up to UE implementation to prioritize PRS measurements over RRM measurements, since by default, RRM measurements will have a higher priority, and the UE may not be able to perform both at the same time.

Figure 6:
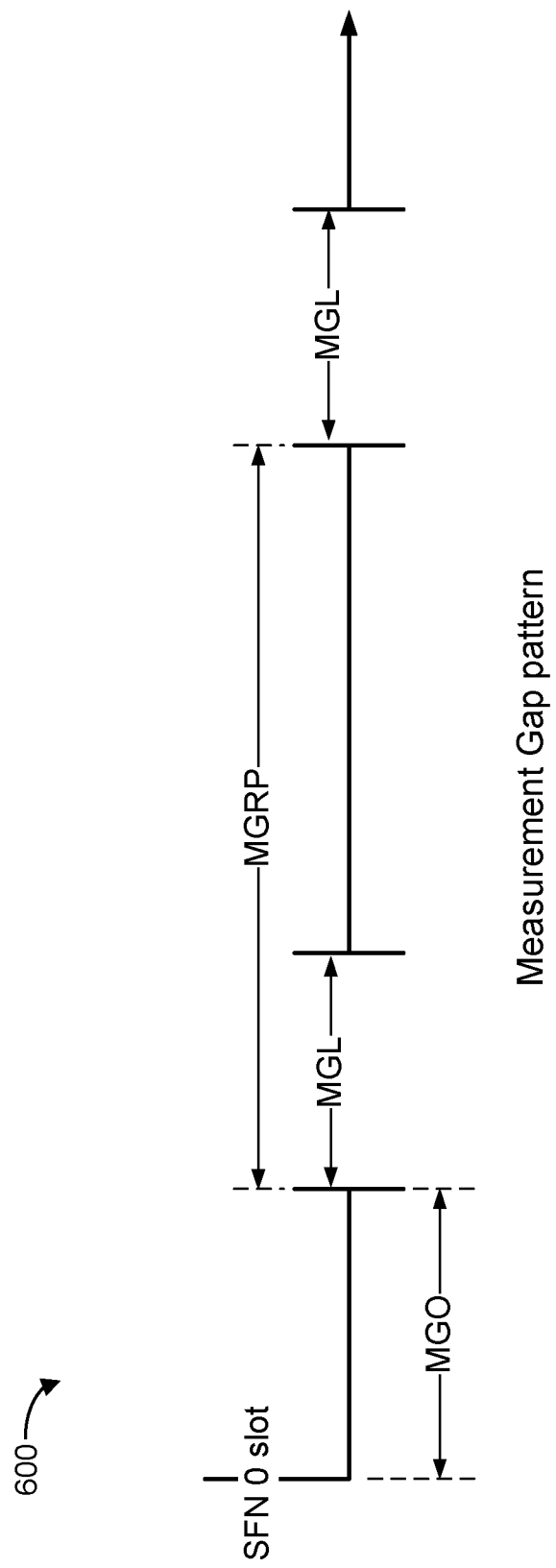
FIG. 6 is a diagram illustrating how the parameters of a measurement gap (MG) configuration specify a pattern of measurement gaps, according to various aspects.

FIG. 6 is a diagram 600 illustrating how the parameters of a measurement gap configuration specify a pattern of measurement gaps, according to aspects of the disclosure. The measurement gap repetition period (MGRP) defines the periodicity (in ms) at which the measurement gap repeats. It can have a value of 20, 40, 80, or 160 ms, although values of 320 and 640 ms are also being considered. The measurement gap length (MGL) is the length of the measurement gap in milliseconds. The measurement gap length can have a value of 1.5, 3, 3.5, 4, 5.5, or 6 ms, although values of 10, 18, 20, 34, 40, and 50 ms are also being considered. The measurement gap offset (MGO) is the offset of the start of the gap pattern from the start of a slot or subframe within the measurement gap repetition period (MGRP). There are currently about 160 offset values, but not all of the values are applicable for all periodicities. More specifically, the offset has a value in the range from '0' to one less than the MGRP. Thus, for example, if the MGRP is 20 ms, then the offset can range from '0' to '19.' Although not shown in FIG. 6, a measurement gap configuration may also include a measurement gap timing advance (MGTA) parameter. If configured, the MGTA indicates the amount of time before the occurrence of the slot or subframe in which the measurement gap is configured to begin. Currently, the MGTA can be 0.25 ms for FR2 or 0.5 ms for FR1. Measurement gaps are configured using the RRC protocol.

A UE or other entity, referred herein as a target device, may determine that it needs PRS resources to measure for positioning purposes, and may issue a request to be configured with such PRS resources. This is referred to herein as "on-demand PRS". On-demand PRS resources that the UE may request include, but are not limited to, a subset of TRPs, specific directions or beams, periodicity, and PRS configuration(s). Positioning procedures in next generation (NG)-RAN may be modelled as transactions of the LPP protocol, which consists of a single operation of one of the following types: an exchange of positioning capabilities, transfer of assistance data (AD), transfer of location information (e.g., positioning measurements and/or an estimated position), error handling, or an abort. An example of an on-demand PRS request is shown in FIG. 7.

Figure 7:
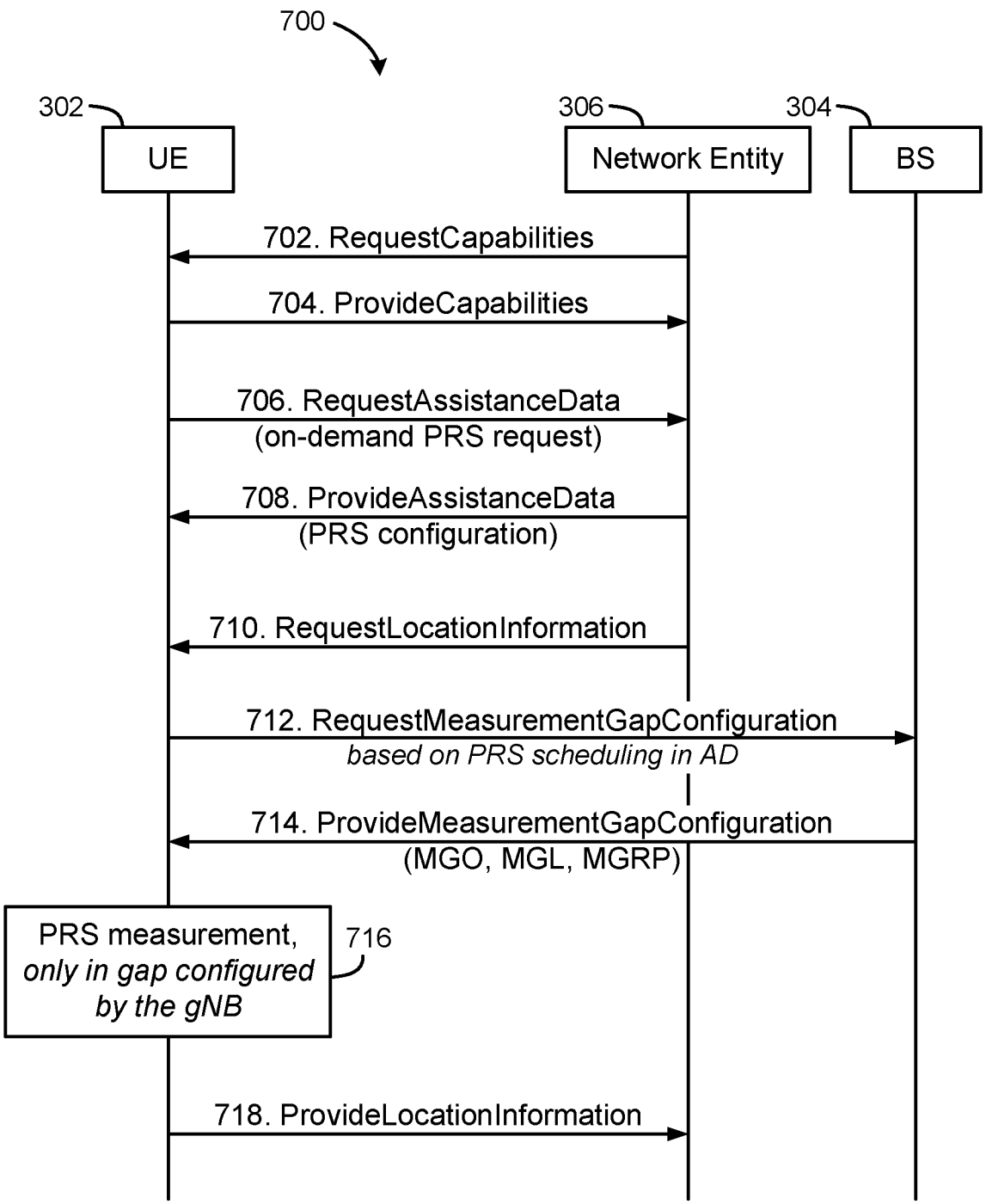
FIG. 7 is a signal messaging diagram showing how a user equipment (UE) receives and uses PRS and MG configuration information.

FIG. 7 is a signal messaging diagram showing how a UE 302 (which may correspond to any of the UEs described herein), a base station 304 (which may correspond to any of the base stations described herein), and a network entity 306 (which may correspond to or embody any of the network functions described herein, including the location server 230 and the LMF 270) may communicate such that the UE 302 gets a PRS configuration from the network entity 306 and gets a measurement gap (MG) configuration from the base station 304.

In the process 700 illustrated in FIG. 7, at 702, the network entity 306 sends to the UE 302 a request for the UE 302 to provide the network entity 306 a list of its capabilities. In response, at 704, the UE 302 provides the network entity 306 with the requested list of capabilities. At 706, the UE 302 sends to the network entity 306 a request for assistance data, which in this example includes an on-demand PRS request. At 708, the network entity 306 provides PRS scheduling information (e.g., information that defines the PRS occasions) to the UE 302.

At 710, the network entity 306 sends to the UE 302 a request for location information. In the example illustrated in FIG. 7, at 712, the UE 302 sends to the serving base station 304 a request for measurement gap configuration information, which may be based on the PRS scheduling information received by the UE 302 at 708. At 714, the base station 304 responds to the UE 302 with one or more MG configurations, each of which may include parameters such as MGO, MGL, MGRP, etc. At 716, the UE 302 performs the PRS measurements, but only within the MG configured by the base station 304. At 718, the UE 302 provides the requested location information to the network entity 306.

FIG. 7 illustrates the point that the network entity 306 and base station 304, in some aspects, may not communicate with each other (although communication is possible): accordingly, in some aspects, the network entity 306 may not know the MG configuration provided to the UE 302 by the base station 304, and the base station 304 may not know the PRS configuration provided to the UE 302 by the network entity 306. There are at least two problems or weaknesses of the conventional method shown in FIG. 7. These problems are illustrated in FIG. 8.

Figure 8:
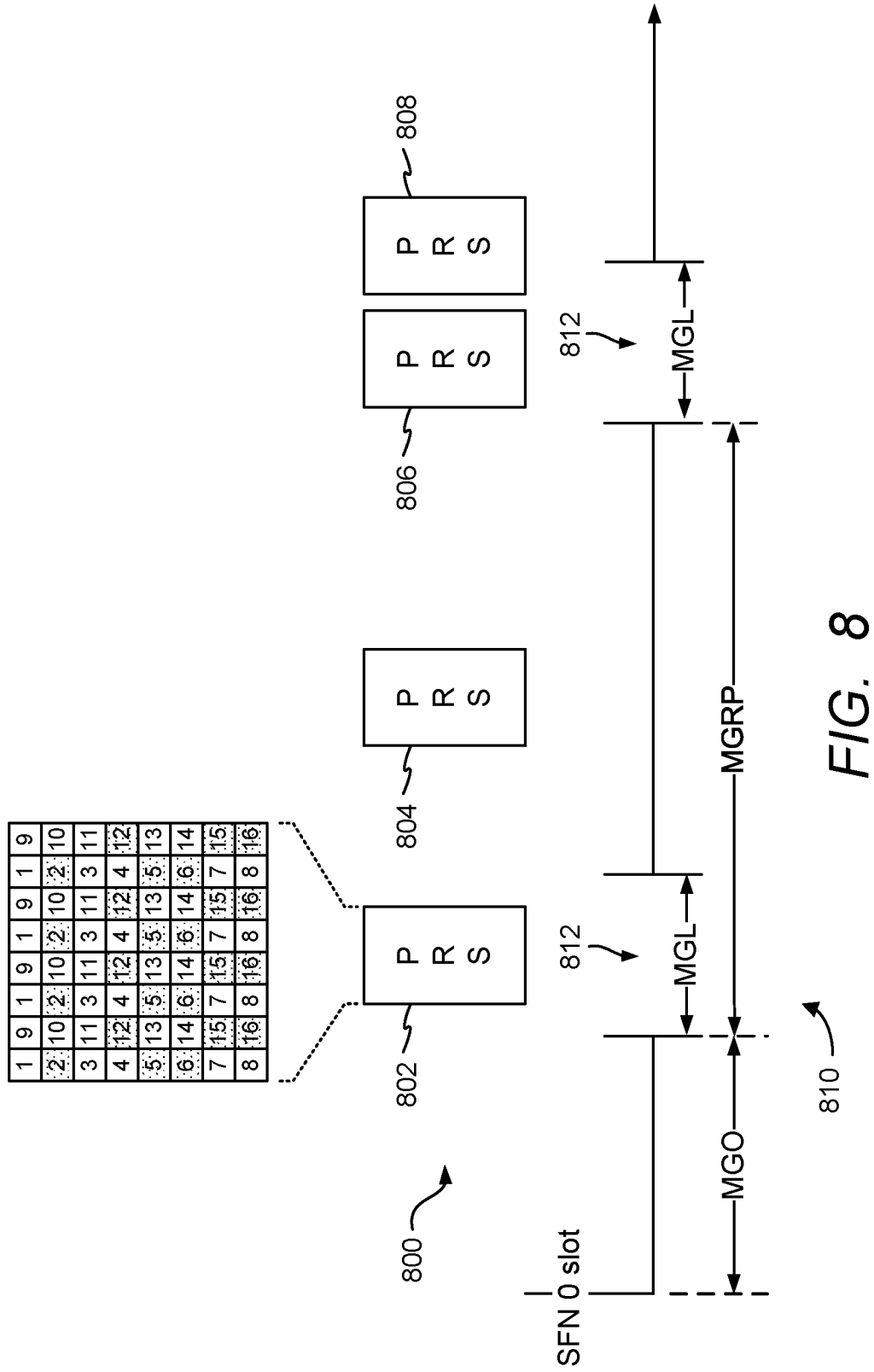
FIG. 8 illustrates some of the problems related to PRS and MG configuration suffered by conventional networks.

FIG. 8 illustrates some of the problems of conventional networks. In the example of FIG. 8, time is represented horizontally, and the blocks labeled "PRS" indicate the locations in time of respective resources that can be used for the PRS measurements. For example, for PRS, the resources may be REs carrying PRS, PRS resources, PRS resource sets, PRS occasions, or the like. In the example of FIG. 8, the network entity 306 has provided the UE 302 with a configuration 800 having four PRS instances, PRS 802, PRS 804, PRS 806, and PRS 808. The base station 304 has provided the UE 302 with an MG configuration 810, having values for MGO, MGRP, and MGL, resulting in the occurrence of measurement gaps 812 and 814. Additional repetitions of measurement gap 812, not shown in FIG. 8, may also exist as part of the MG configuration 810.

One problem illustrated in FIG. 8 is that the network entity 306 may configure PRS occasions that the UE 302 cannot use because all or part of those PRS occasions fall outside of the measurement gaps defined by the base station 304. This situation may occur because of the lack of coordination between the base station 304 and the network entity 306, or it may occur because the base station 304 cannot provide the UE 302 with sufficient measurement gaps because of other constraints, such as that there are many UEs currently being supported by the base station 304 and the measurement gaps must be apportioned among them all. In the example shown in FIG. 8, because PRS 804 does not lie within the first instance of the measurement gap 812, PRS 804 cannot be used by the UE 302. Because PRS 808 does not lie entirely within the second instance of the measurement gap 812, PRS 808 cannot be used by the UE 302. In conventional networks, the UE 302 has no mechanism by which it can inform the network entity 306 that the UE 302 cannot use those PRS instances.

Another problem illustrated in FIG. 8 is that the network entity 306 may configure PRS instances with a large number of TRPs. This may be done because the network entity 306 is not aware of the current position of UE 302, and by providing more PRS occasions in the assistance data that the network entity 306 sends to the UE 302, the network entity 306 can help make sure that the UE 302 will get a high number and/or high quality of positioning estimates. After every PRS occasion measurement, the UE 302 will have an estimate of its rough position with reference to the TRPs. Some TRP signals will be very strong, some signals will be weak, and some signals will be too weak for the UE 302 to be able to decode.

In FIG. 8, as shown by the detail of PRS 802, the network entity 306 has configured each PRS occasion to have 16 TRPs, labeled 1 through 16, with each TRP repeating four times per PRS occasion. In the example detail, the shaded squares represent a TRP that the UE 302 cannot receive, can receive only weakly, and/or is a TRP with a relatively low connection priority for the UE 302. Nevertheless, the UE 302 must attempt to decode PRS signals from all 16 TRPs. In conventional networks, the UE 302 has no mechanism by which it can inform the network entity 306 that certain TRPs are of low quality or low priority.

Figure 9:
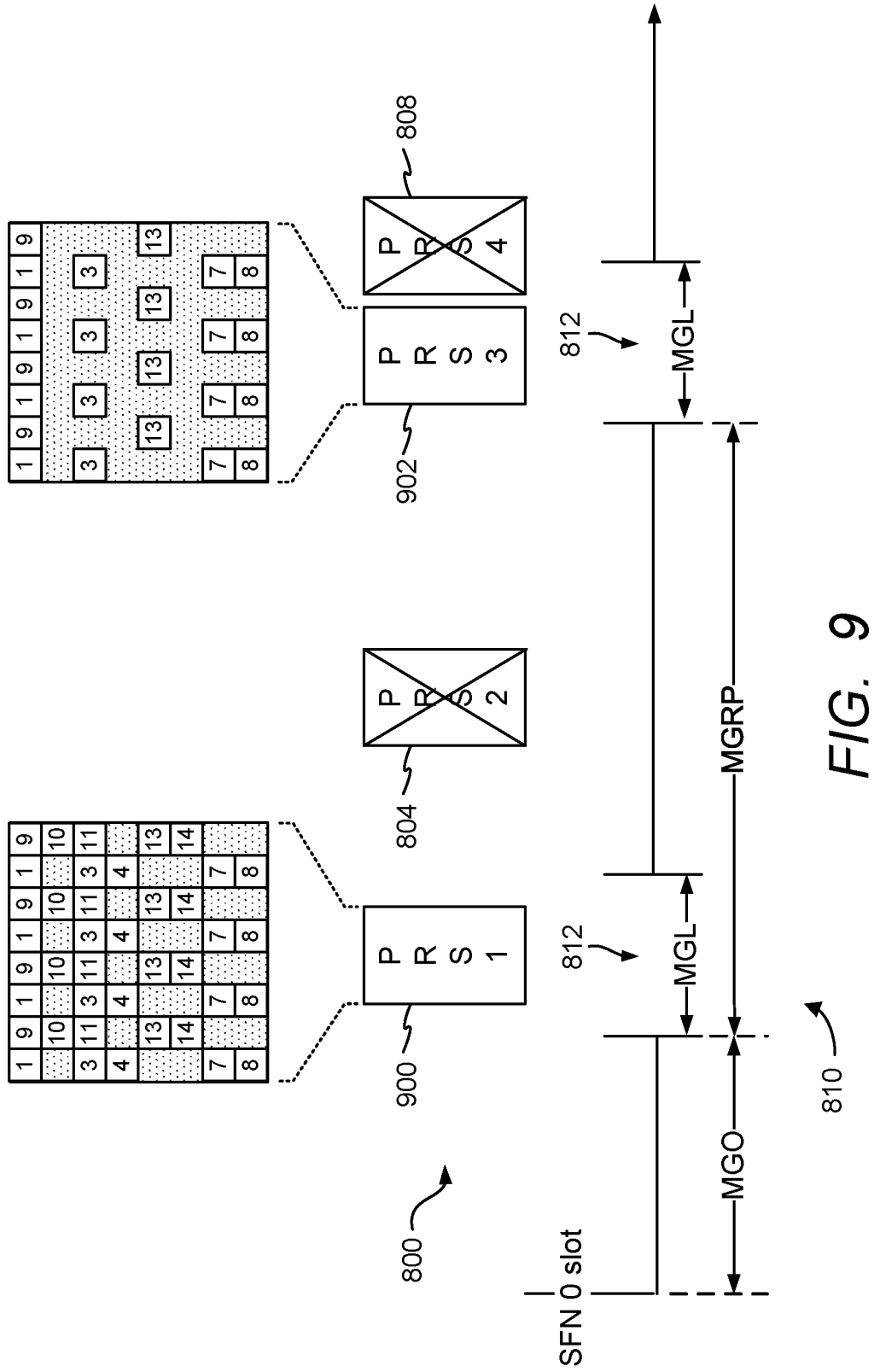
FIG. 9 illustrates some solutions to the problems related to PRS and MG configurations, according to various aspects.

FIG. 9 illustrates methods according to some aspects of the disclosure. In FIG. 9, the UE 302 may notify the network entity 306 that the UE 302 wants to modify some aspect of the PRS configuration that the UE 302 previously received from the network entity 306. For example, in FIG. 9, the UE 302 may notify the network entity 306 that PRS instances PRS 804 and PRS 808 should be entirely cancelled because they are outside of the MG and thus unusable by the UE 302. Likewise, the UE 302 may notify the network entity 306 that TRPs 2, 5, 6, 12, 15, and 16 have low quality or low priority and should be ignored for all PRS instances. In some aspects, this UE 302 may include this information in PRS modification information that the UE 302 sends to the network entity 306. In FIG. 9, TRPs 2, 5, 6, 12, 15, and 16 are not measured in modified PRS instance 900. Likewise, the UE 302 may indicate to the network entity 306 that some TRPs need not be measured for at every PRS instance. For example, in FIG. 9, TRPs 4, 10, 11, and 14 are measured at modified PRS instance 900 but not measured at modified PRS instance 902.

Accordingly, the present disclosure provides techniques by which the UE 302 may modify the PRS configuration that was provided to it by the network entity 306. According to some aspects, the UE 302 may send to the network entity 306 a specific request to modify the PRS configuration in a particular way. The request to modify the PRS configuration may include a request to cancel, or remove, or reduce the overhead of, one or more PRS resource sets, one or more PRS resources in the one or more PRS resource sets, one or more PRS instances of the one or more PRS resources, and/or one or more repetitions of PRS instances. The request to modify the PRS configuration may include a request to cancel, or remove, the PRS resources of one or more frequency layers, one or more transmission/reception points of a frequency layer, one or more frequency layers of one or more transmission/reception points, and/or PRS resources associated with specific repetitions of the above. The request to modify the PRS configuration may indicate a start time, a stop time, a duration, or combinations thereof, associated with modifying the PRS configuration. The request may be associated with a time T or a particular timer.

According to other aspects, the UE 302 will send to the network entity 306 information related to the PRS measurement and the network entity 306 may take action based on one or more values measured. According to some aspects, the UE 302 will send to the network entity 306 the values measured and additional information from the UE 302 for every PRS occasion configured. This additional information, which the UE 302 may send along with the results of the PRS measurements, is herein referred to as "PRS modification information" and may include a specific request for modification of the PRS configuration, information which the network entity 306 may use to determine that a modification to the PRS configuration should be made, or a combination of the above.

Figure 10:
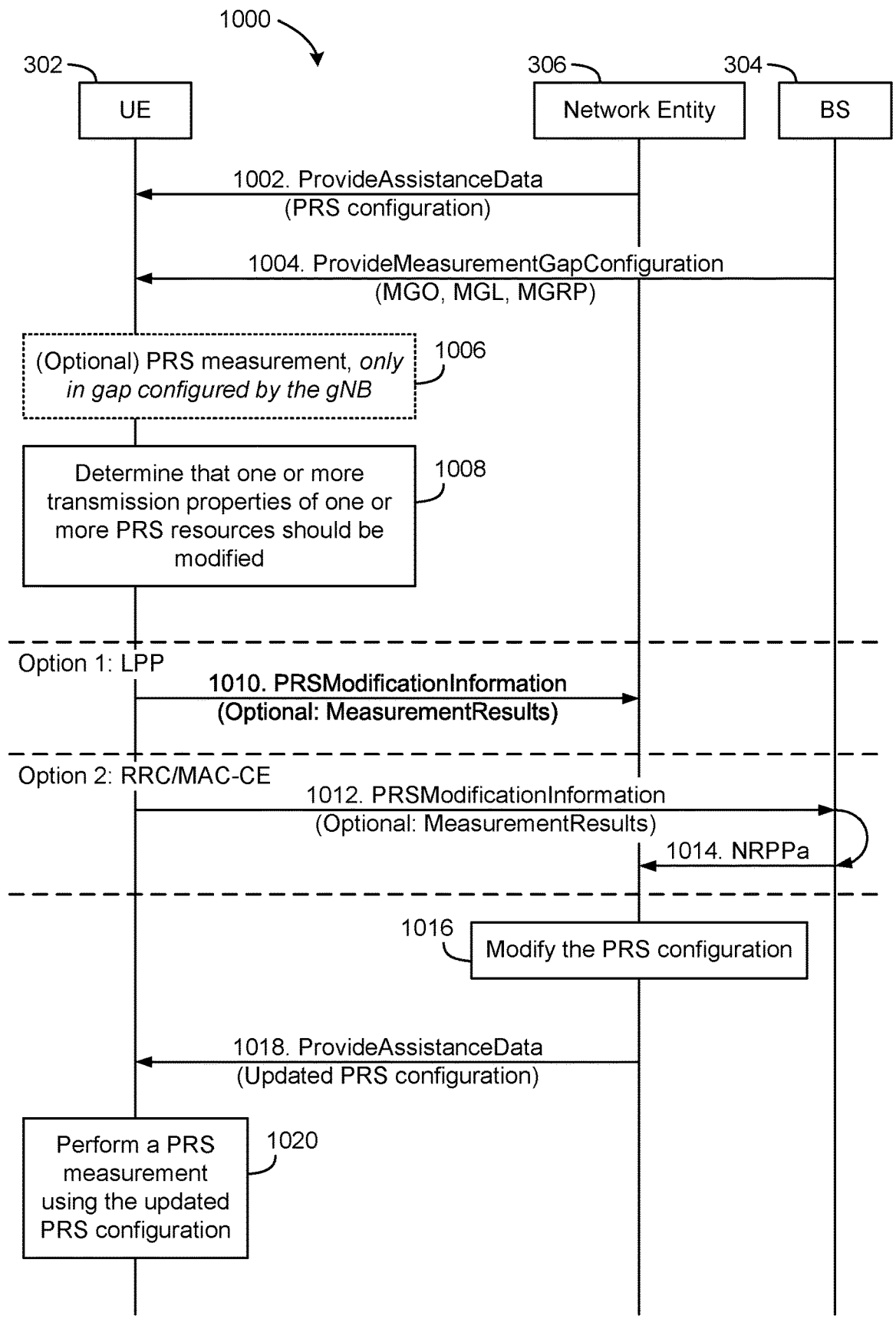
FIG. 10 is a signal messaging diagram showing how a UE may modify a PRS configuration, according to various aspects.

FIG. 10 is a signal messaging diagram showing a method 1000 of modifying a PRS resource according to some aspects of the disclosure. In FIG. 10, a UE 302 (which may correspond to any of the UEs described herein), a base station 304 (which may correspond to any of the base stations described herein) and a network entity 306 (which may correspond to or embody any of the network functions described herein, including the location server 230 and the LMF 270) may communicate such that the UE 302 requests cancellation of PRS resources previously provided to the UE 302 in response to an on-demand PRS request.

In the simplified process illustrated in FIG. 10, at 1002, the UE 302 receives a PRS configuration from the network entity 306. At 1004, the UE 302 receives a measurement gap (MG) configuration from the base station 304. It is noted that 1002 and 1004 may occur in any order.

In some aspects, at 1006, the UE 302 performs a PRS measurement. In these aspects, at 1008, the UE 302 may determine, based on the PRS measurements, that modification of the PRS configuration is desired, such as when the UE 302 determines that some PRS resources are of low quality or low value. Referring to FIG. 9, for example, the UE 302 may determine that the signals from some TRPs and/or in some frequency layers are too faint or too noisy to decode successfully. In these aspects, the UE 302 may desire to cancel those TRPs or frequency layers, i.e., remove them from the PRS configuration. In some aspects, the UE 302 may send the PRS measurement results along with the PRS modification information after every PRS measurement. In some aspects, as the UE 302 becomes more confident about its current location, the UE 302 may not need as many PRS resources as were originally provisioned in the PRS configuration from the network entity 306. Thus, the PRS resources used by the UE 302 may be dynamically adjusted, e.g., by the UE 302.

In other aspects, the PRS measurement step at 1006 may be omitted. For example, at 1008, the UE 302 may determine, based upon the received PRS configuration and MG configuration alone that modification of the PRS configuration is desired, such as when the UE 302 can determine that some of the PRS instances defined by the PRS configuration are not within a MG defined by MG configuration. In these aspects, the UE 302 may desire to cancel those PRS instances, i.e., remove them from the PRS configuration. (Likewise, the UE 302 may also make such determinations after performing the PRS measurement step at 1006, i.e., in aspects where 1006 is not omitted.)

In FIG. 10, once the UE 302 determines that some PRS resources should be modified, in some aspects, at 1010, the UE 302 may use the LPP protocol to send the PRS modification information directly to the network entity 306. Alternatively, at 1010, the UE 302 may send the PRS modification information to the base station 304 via RRC and medium access control (MAC) control element (MAC-CE). In these aspects, the base station 304 may, at 1012 and 1014, send the PRS modification information to the network entity 306 through new radio positioning protocol type A (NRPPa) signaling.

According to some aspects, the modifications to the PRS configuration that the UE 302 may request may include cancellation, removal, or reduction of the overhead of, one or more PRS resource sets, one or more PRS resources in the one or more PRS resource sets, one or more PRS instances of the one or more PRS resources, and/or one or more repetitions of PRS instances. Referring again to FIG. 9, for example, the PRS modification information may request cancellation of specific PRSs, such as PRS 804 and PRS 808, and may request cancellation of specific RPSs that are not within a measurement gap.

Within a specific PRS instance, the modifications to the PRS configuration that the UE 302 may request may include cancellation or removal of the PRS resources of one or more frequency layers, one or more transmission/reception points of a frequency layer, one or more frequency layers of one or more transmission/reception points, and/or PRS resources associated with specific repetitions of the above. Referring again to FIG. 9, for example, the PRS modification information may request cancellation of TRPs 2, 5, 6, 12, 15, and 16 from the first PRS instance 900 and cancellation of additional TRPs 4, 10, 11, and 14 from PRS instance 902 and later. In some aspects, the PRS modification information may lead to cancellation of previously configured repetitions of PRS instances and/or PRS resources within PRS instances. In some aspects, the PRS modification information may identify TRPs that have low signal strength or low usefulness to the specific UE 302, in which case the network entity 306 may decide to modify the PRS configuration to remove those identified TRPs. The PRS modification information may indicate a start time, a stop time, a duration, or combinations thereof, associated with modifying the PRS configuration. The request may be associated with a time T or a particular timer.

Returning to FIG. 10, at 1016, upon receiving the PRS modification information, the network entity 306 may modify the PRS configuration for the UE 302 or other UEs, and at 1018, the network entity 306 may send the updated PRS configuration to the UE 302. According to some aspects, actions that the network entity 306 may take include, but are not limited to, the following. The network entity 306 may shut down some PRS elements that the UE 302 has reported as not being used by the UE 302. As used herein, the term "PRS elements" may refer to one or more of the following: TRPs, PRS resources, PRS resource sets, frequency layers, and/or repetitions of the above. The network entity 306 may redesign or update the assistance data, including but not limited to, deleting some existing PRS elements, adding some PRS elements, and/or changing the ordering or priority of existing PRS elements. In some aspects, the updated PRS configuration may replace the original PRS configuration until further notice from the network entity 306. In other aspects, the updated PRS configuration may temporarily override the original PRS configuration for a specified amount of time T, from a specified start time to a specified end time, for a specified number of PRS occasions N, until some other trigger event, or some combination of the above. In some aspects, the modification to the PRS configuration may be cancelled upon detection of a serving cell change. The PRS modification information may be sent as a periodic report from the UE 302, as a one-shot/unsolicited report, or on-demand as needed by the UE 302.

The techniques described herein have various technical advantages over the prior art, such as: by providing a mechanism for cancelling, removing, or reducing the overhead of PRS elements, the UE 302 will have a reduced search space for subsequent PRS occasion measurements, which will benefit the UE 302 by reducing its power consumption and improving its battery live, and which will benefit the network by improving network efficiency.

Figure 11:
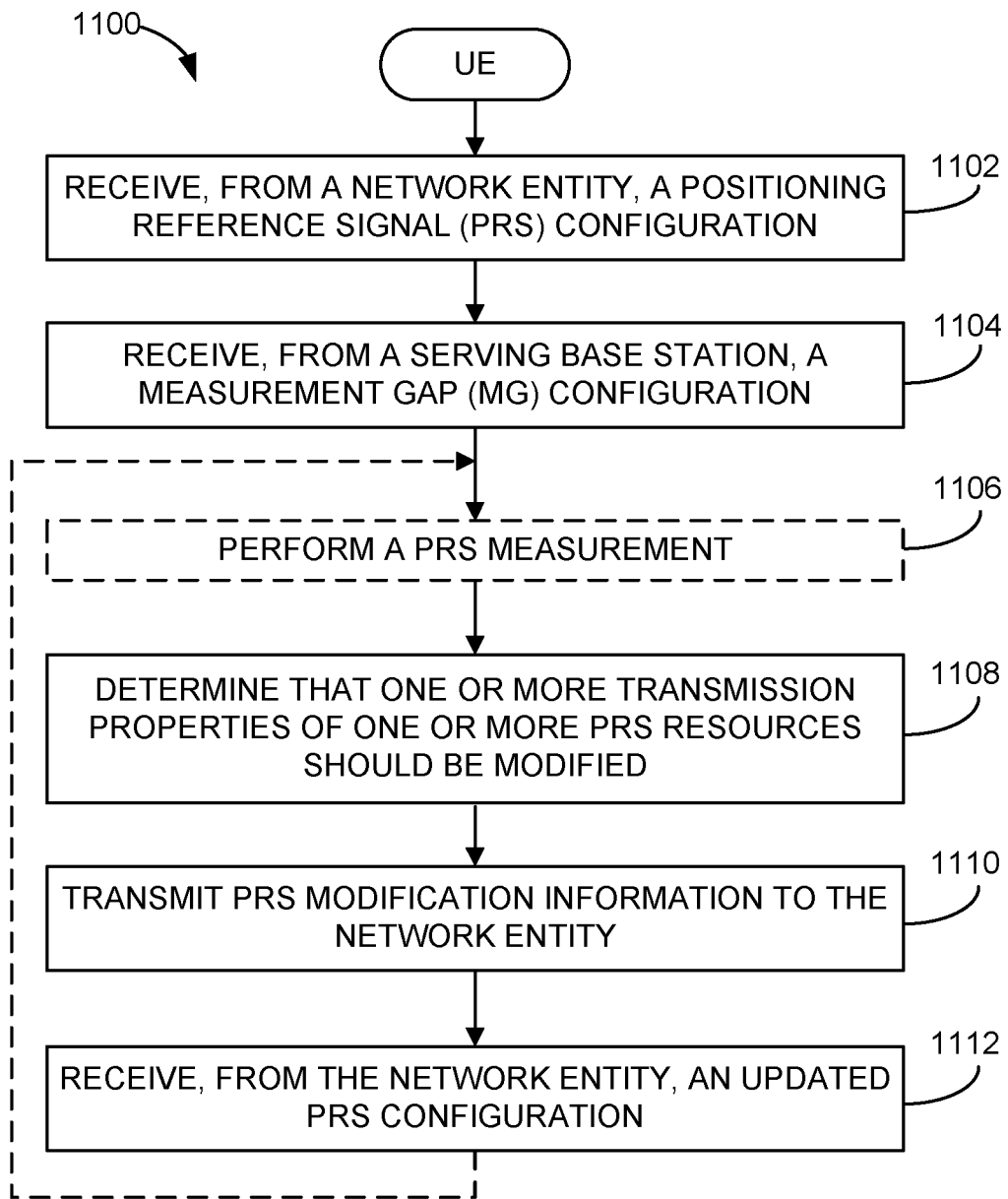
FIGS. 11 to 13 illustrate exemplary methods of wireless communication, according to aspects of the disclosure.

FIG. 11 illustrates an exemplary method 1100 of wireless communication, according to aspects of the disclosure. In an aspect, method 1100 may be performed by a UE (e.g., any of the UEs described herein). In FIG. 11, at 1102, the UE receives, from a location server (e.g., network entity 306), a PRS configuration. The PRS configuration defines PRS instances, TRPs, frequency layers, repetitions, and other PRS resources, collectively referred to as "PRS elements." In an aspect, 1102 may be performed by WWAN transceiver 310, processing system 332, memory component 340, and/or positioning component 342, any or all of which may be considered means for performing this operation.

At 1104, the UE receives, from a serving base station (e.g., base station 304), a MG configuration. The MG configuration defines measurement gaps, and may include values for MGO, MGL, MGRP, etc. The MG configuration may be received by higher layer signaling (e.g., RRC signaling). In an aspect, 1104 may be performed by WWAN transceiver 310, processing system 332, memory component 340, and/or positioning component 342, any or all of which may be considered means for performing this operation.

Optionally, at 1106, the UE may perform a PRS measurement of one or more non-serving base stations during measurement gaps specified by the first measurement gap configuration. In an aspect, 1106 may be performed by WWAN transceiver 310, processing system 332, memory component 340, and/or positioning component 342, any or all of which may be considered means for performing this operation.

At 1108, the UE determines that one or more transmission properties of one or more resources should be modified, e.g., that one or more PRS elements or repetitions thereof should be cancelled, removed, or have the overhead of reduced. In an aspect, 1108 may be performed by WWAN transceiver 310, processing system 332, memory component 340, and/or positioning component 342, any or all of which may be considered means for performing this operation.

At 1110, the UE sends PRS modification information to the location server. In an aspect where 1106 was performed, the results of a PRS measurement may also be sent to the location server. In an aspect, the PRS modification information may be sent using LPP. In an aspect, the PRS modification information may be sent using RRC/MAC-CE to the serving base station, which forwards the information to the location server via NRPPa. In an aspect, 1108 may be performed by WWAN transceiver 310, processing system 332, memory component 340, and/or positioning component 342, any or all of which may be considered means for performing this operation.

At 1112, the UE receives an updated PRS configuration from the location server. In an aspect, the process returns to 1106. In an aspect, 1108 may be performed by WWAN transceiver 310, processing system 332, memory component 340, and/or positioning component 342, any or all of which may be considered means for performing this operation.

Figure 12:
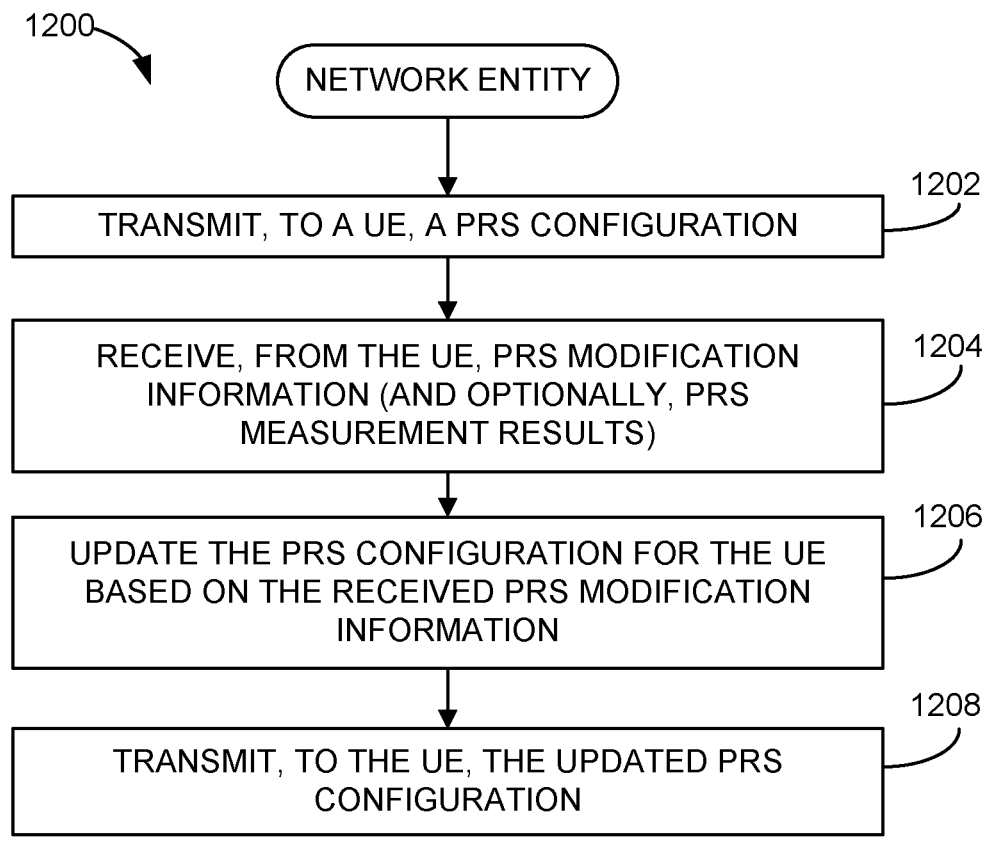

FIG. 12 illustrates an exemplary method 1200 of wireless communication, according to aspects of the disclosure. In an aspect, method 1200 may be performed by a location server (e.g., any of the base stations described herein), such as network entity 306. At 1202, the location server transmits a PRS configuration to a UE. In an aspect, 1202 may be performed by network interface 390, processing system 394, memory component 396 and/or positioning component 398, and or all of which may be considered means for performing this operation.

At 1204, the location server receives, from the UE, PRS modification information, which may or may not include the results of a PRS measurement operation by the UE. In an aspect, 1204 may be performed by network interface 390, processing system 394, memory component 396 and/or positioning component 398, and or all of which may be considered means for performing this operation.

At 1206, the location server updates the PRS configuration for the UE based on the received PRS modification information. In an aspect, 1206 may be performed by network interface 390, processing system 394, memory component 396 and/or positioning component 398, and or all of which may be considered means for performing this operation.

At 1208, the location server transmits, to the UE, the updated PRS configuration for the UE. In an aspect, 1206 may be performed by network interface 390, processing system 394, memory component 396 and/or positioning component 398, and or all of which may be considered means for performing this operation.

Figure 13:
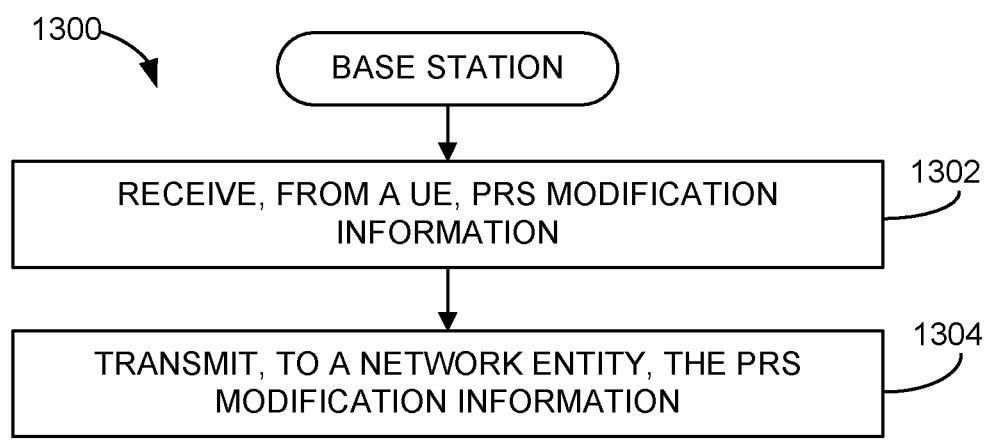

FIG. 13 illustrates an exemplary method 1300 of wireless communication, according to aspects of the disclosure. In an aspect, method 1300 may be performed by a serving base station (e.g., any of the base stations described herein).

At 1302, the base station receives, from a UE, PRS modification information. In an aspect, the base station also receives, from the UE, a result of a PRS measurement. In an aspect, operation 1310 may be performed by WWAN transceiver 350, processing system 384, memory component 386, and/or positioning component 388, any or all of which may be considered means for performing this operation.

At 1304, the base station transmits, to a network entity associated with the UE, the PRS modification information. In some aspects, the network entity is a location server or an LMF. In aspects where the base station also received a result of a PRS measurement by the UE, the base station may transmit that information to the network entity as well. In an aspect, the base station may transmit information to the network entity via NRPPa. In an aspect, operation 1320 may be performed by WWAN transceiver 350, processing system 384, memory component 386, and/or positioning component 388, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), the method comprising: receiving, from a network entity, a positioning reference signal (PRS) configuration; receiving, from a serving base station, a measurement gap (MG) configuration; determining that one or more transmission properties of one or more PRS resources should be modified; and transmitting PRS modification information to the network entity, based on the one or more transmission properties of one or more PRS resources to be modified.

Clause 2. The method of clause 1, wherein the network entity comprises a location server, a location management function, or a transmission/reception point.

Clause 3. The method of any of clauses 1 to 2, wherein the method further comprises, prior to determining that one or more transmission properties of one or more PRS resources should be modified, performing a PRS measurement on the one or more PRS resources.

Clause 4. The method of clause 3, wherein performing the PRS measurement comprises performing PRS measurements of one or more transmission/reception points (TRPs) during measurement gaps specified by the MG configuration.

Clause 5. The method of any of clauses 1 to 4, wherein transmitting PRS modification information to the network entity comprises transmitting PRS measurement results.

Clause 6. The method of clause 5, wherein transmitting PRS measurement results comprises transmitting a reference signal received power (RSRP) value, a reference signal time difference (RSTD) value, a reception to transmission (Rx-Tx) value, or a combination thereof.

Clause 7. The method of any of clauses 1 to 6, further comprising: receiving, from the network entity, an updated PRS configuration; and performing a PRS measurement using the updated PRS configuration.

Clause 8. The method of any of clauses 1 to 7, wherein transmitting PRS modification information comprises transmitting PRS modification information via radio resource control (RRC), long term evolution (LTE) positioning protocol (LPP), medium access control (MAC) control element (MAC-CE), or downlink control information (DCI), or a combination thereof.

Clause 9. The method of any of clauses 1 to 8, wherein transmitting PRS modification information comprises transmitting a request to modify the PRS configuration.

Clause 10. The method of clause 9, wherein transmitting the request to modify the PRS configuration comprises transmitting a request to cancel or remove PRS instances that are not within a measurement gap.

Clause 11. The method of any of clauses 9 to 10, wherein transmitting the request to modify the PRS configuration comprises transmitting a request to cancel, or remove, or reduce overhead of, one or more PRS resource sets, one or more PRS resources in the one or more PRS resource sets, one or more PRS instances of the one or more PRS resources, one or more repetitions of PRS instances, or a combination thereof.

Clause 12. The method of any of clauses 9 to 11, wherein transmitting the request to modify the PRS configuration comprises transmitting a request to cancel, or remove, PRS resources of one or more frequency layers, one or more transmission/reception points of a frequency layer, one or more frequency layers of one or more transmission/reception points, PRS resources associated with specific repetitions of the above, or a combination thereof.

Clause 13. The method of any of clauses 9 to 12, wherein transmitting PRS modification information comprises transmitting information that indicates a start time, a stop time, a duration, or a combination thereof, associated with modifying the PRS configuration.

Clause 14. A method of wireless communication performed by a network entity, the method comprising: transmitting, to a user equipment (UE), a positioning reference signal (PRS) configuration; receiving, from the UE, PRS modification information; updating the PRS configuration for the UE based on the PRS modification information; and transmitting, to the UE, the updated PRS configuration.

Clause 15. The method of clause 14, wherein the network entity comprises a location server, a location management function, or a transmission/reception point.

Clause 16. The method of any of clauses 14 to 15, wherein the PRS modification information is received via radio resource control (RRC), long term evolution (LTE) positioning protocol (LPP), medium access control (MAC) control element (MAC-CE), or downlink control information (DCI), or a combination thereof.

Clause 17. The method of any of clauses 14 to 16, wherein receiving PRS modification information comprises receiving a request modify the PRS configuration.

Clause 18. The method of clause 17, wherein receiving PRS modification information comprises receiving PRS measurement results.

Clause 19. The method of clause 18, wherein receiving PRS measurement results comprises receiving a reference signal received power (RSRP) value, a reference signal time difference (RSTD) value, a reception to transmission (Rx-Tx) value, or a combination thereof.

Clause 20. The method of any of clauses 17 to 19, wherein receiving the request to modify the PRS configuration comprises receiving a request to cancel or remove PRS instances that are not within a measurement gap.

Clause 21. The method of any of clauses 17 to 20, wherein receiving the request to modify the PRS configuration comprises receiving a request to cancel, or remove, or reduce overhead of, one or more PRS resource sets, one or more PRS resources in the one or more PRS resource sets, one or more PRS instances of the one or more PRS resources, one or more repetitions of PRS instances, or a combination thereof.

Clause 22. The method of any of clauses 17 to 21, wherein receiving the request to modify the PRS configuration comprises receiving a request to cancel, or remove, PRS resources of one or more frequency layers, one or more transmission/reception points of a frequency layer, one or more frequency layers of one or more transmission/reception points, PRS resources associated with specific repetitions of the above, or a combination thereof.

Clause 23. The method of any of clauses 17 to 22, wherein receiving PRS modification information comprises receiving information that indicates a start time, a stop time, a duration, or a combination thereof, for modifying the PRS configuration.

Clause 24. The method of any of clauses 14 to 23, further comprising: receiving, from the UE, a report comprising one or more measurements of one or more non-serving base stations performed by the UE during measurement gaps specified by a MG configuration.

Clause 25. A user equipment (UE), comprising: a memory; at least one transceiver; and at least one processor communicatively coupled to the memory and the at least one transceiver, the at least one processor configured to: receive, from a network entity, a positioning reference signal (PRS) configuration; receive, from a serving base station, a measurement gap (MG) configuration; determine that one or more transmission properties of one or more PRS resources should be modified; and cause the at least one transceiver to transmit PRS modification information to the network entity, based on the one or more transmission properties of one or more PRS resources to be modified.

Clause 26. The UE of clause 25, wherein the network entity comprises a location server, a location management function, or a transmission/reception point.

Clause 27. The UE of any of clauses 25 to 26, wherein the at least one processor is further configured to, prior to determining that one or more transmission properties of one or more resources should be modified, perform a PRS measurement.

Clause 28. The UE of clause 27, wherein performing the PRS measurement comprises performing PRS measurements of one or more non-serving base stations performed by the UE during measurement gaps specified by the MG configuration.

Clause 29. The UE of any of clauses 25 to 28, wherein the PRS modification information comprises PRS measurement results.

Clause 30. The UE of clause 29, wherein the PRS measurement results comprise a reference signal received power (RSRP) value, a reference signal time difference (RSTD) value, a reception to transmission (Rx-Tx) value, or a combination thereof.

Clause 31. The UE of any of clauses 25 to 30, wherein the at least one processor is further configured to: receive, from the network entity, an updated PRS configuration; and perform a PRS measurement using the updated PRS configuration.

Clause 32. The UE of any of clauses 25 to 31, wherein the PRS modification information is transmitted via radio resource control (RRC), long term evolution (LTE) positioning protocol (LPP), medium access control (MAC) control element (MAC-CE), or downlink control information (DCI), or a combination thereof.

Clause 33. The UE of any of clauses 25 to 32, wherein the PRS modification information comprises a request to modify the PRS configuration.

Clause 34. The UE of clause 33, wherein the request to modify the PRS configuration comprises a request to cancel or remove PRS instances that are not within a measurement gap.

Clause 35. The UE of any of clauses 33 to 34, wherein the request to modify the PRS configuration comprises a request to cancel, or remove, or reduce overhead of, one or more PRS resource sets, one or more PRS resources in the one or more PRS resource sets, one or more PRS instances of the one or more PRS resources, one or more repetitions of PRS instances, or a combination thereof.

Clause 36. The UE of any of clauses 33 to 35, wherein the request to modify the PRS configuration comprises a request to cancel, or remove, PRS resources of one or more frequency layers, one or more transmission/reception points of a frequency layer, one or more frequency layers of one or more transmission/reception points, PRS resources associated with specific repetitions of the above, or a combination thereof.

Clause 37. The UE of any of clauses 33 to 36, wherein the PRS modification information indicates a start time, a stop time, a duration, or a combination thereof, associated with modifying the PRS configuration.

Clause 38. A network entity, comprising: a memory; at least one network interface; and at least one processor communicatively coupled to the memory and the at least one network interface, the at least one processor configured to: cause the at least one network interface to transmit, to a user equipment (UE), a positioning reference signal (PRS) configuration; receive, from the UE, PRS modification information; update the PRS configuration for the UE based on the PRS modification information; and cause the at least one network interface to transmit, to the UE, the updated PRS configuration.

Clause 39. The network entity of clause 38, comprising a location server, a location management function, or a transmission/reception point.

Clause 40. The network entity of any of clauses 38 to 39, wherein the PRS modification information is received via radio resource control (RRC), long term evolution (LTE) positioning protocol (LPP), medium access control (MAC) control element (MAC-CE), or downlink control information (DCI), or a combination thereof.

Clause 41. The network entity of any of clauses 38 to 40, wherein the PRS modification information comprises a request modify the PRS configuration.

Clause 42. The network entity of clause 41, wherein the PRS modification information comprises PRS measurement results.

Clause 43. The network entity of clause 42, wherein the PRS measurement results comprise a reference signal received power (RSRP) value, a reference signal time difference (RSTD) value, a reception to transmission (Rx-Tx) value, or a combination thereof.

Clause 44. The network entity of any of clauses 41 to 43, wherein the request to modify the PRS configuration comprises a request to cancel or remove PRS instances that are not within a measurement gap.

Clause 45. The network entity of any of clauses 41 to 44, wherein the request to modify the PRS configuration comprises a request to cancel, or remove, or reduce overhead of, one or more PRS resource sets, one or more PRS resources in the one or more PRS resource sets, one or more PRS instances of the one or more PRS resources, one or more repetitions of PRS instances, or a combination thereof.

Clause 46. The network entity of any of clauses 41 to 45, wherein the request to modify the PRS configuration comprises a request to cancel, or remove, PRS resources of one or more frequency layers, one or more transmission/reception points of a frequency layer, one or more frequency layers of one or more transmission/reception points, PRS resources associated with specific repetitions of the above, or a combination thereof.

Clause 47. The network entity of any of clauses 41 to 46, wherein the PRS modification information indicates a start time, a stop time, a duration, or a combination thereof, for modifying the PRS configuration.

Clause 48. The network entity of any of clauses 38 to 47, wherein the at least one processor is further configured to: receive, from the UE, a report comprising one or more measurements of one or more non-serving base stations performed by the UE during measurement gaps specified by a MG configuration.

Clause 49. An apparatus comprising a memory, a transceiver, and a processor communicatively coupled to the memory and the transceiver, the memory, the transceiver, and the processor configured to perform a method according to any of clauses 1 to 48.

Clause 50. An apparatus comprising means for performing a method according to any of clauses 1 to 48.

Clause 51. A non-transitory computer-readable medium storing computer-executable instructions, the computer-executable comprising at least one instruction for causing a computer or processor to perform a method according to any of clauses 1 to 48.

The following are additional aspects:

In an aspect, a method of wireless communication performed by a user equipment (UE) includes receiving, from a network entity, a positioning reference signal (PRS) configuration; receiving, from a serving base station, a measurement gap (MG) configuration; determining that one or more transmission properties of one or more PRS resources should be modified; and transmitting PRS modification information to the network entity, based on the one or more transmission properties of one or more PRS resources to be modified.

In some aspects, the network entity comprises a location server, a location management function, or a transmission/reception point.

In some aspects, the method further comprises, prior to determining that one or more transmission properties of one or more resources should be modified, performing a PRS measurement on the one or more PRS resources.

In some aspects, performing a PRS measurement comprises performing PRS measurements of one or more transmission/reception points (TRPs) during measurement gaps specified by the MG configuration.

In some aspects, transmitting PRS modification information to the network entity comprises transmitting PRS measurement results.

In some aspects, the method includes receiving, from the network entity, an updated PRS configuration; and performing a PRS measurement using the updated PRS configuration.

In some aspects, the PRS modification information is transmitted via radio resource control (RRC), long term evolution (LTE) positioning protocol (LPP), medium access control (MAC) control element (MAC-CE), or downlink control information (DCI).

In some aspects, the PRS modification information comprises a request to modify the PRS configuration.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In an aspect, a method of wireless communication performed by a network entity includes transmitting, to a user equipment (UE), a positioning reference signal (PRS) configuration; receiving, from the UE, PRS modification information; updating the PRS configuration for the UE based on the PRS modification information; and transmitting, to the UE, the updated PRS configuration.

In some aspects, the network entity comprises a location server, a location management function, or a transmission/reception point.

In some aspects, the PRS modification information is received via radio resource control (RRC), long term evolution (LTE) positioning protocol (LPP), medium access control (MAC) control element (MAC-CE), or downlink control information (DCI).

In some aspects, the PRS modification information comprises a request modify the PRS configuration.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the method includes receiving, from the UE, a report comprising one or more measurements of one or more non-serving base stations performed by the UE during measurement gaps specified by a MG configuration.

In an aspect, a method of wireless communication performed by a base station includes receiving, from a user equipment (UE), positioning reference signal (PRS) modification information; and transmitting, to a network entity, the PRS modification information.

In some aspects, the network entity comprises a location server, a location management function, or a transmission/reception point.

In some aspects, the PRS modification information is received or transmitted via radio resource control (RRC), long term evolution (LTE) positioning protocol (LPP), medium access control (MAC) control element (MAC-CE), or downlink control information (DCI).

In an aspect, a user equipment (UE) includes a memory; at least one transceiver; and at least one processor communicatively coupled to the memory and the at least one transceiver, the at least one processor configured to: receive, from a network entity, a positioning reference signal (PRS) configuration; receive, from a serving base station, a measurement gap (MG) configuration; determine that one or more transmission properties of one or more PRS resources should be modified; and cause the at least one transceiver to transmit PRS modification information to the network entity, based on the one or more transmission properties of one or more PRS resources to be modified.

In some aspects, the at least one processor is further configured to, prior to determining that one or more transmission properties of one or more resources should be modified, performing a PRS measurement.

In some aspects, performing a PRS measurement comprises performing PRS measurements of one or more non-serving base stations performed by the UE during measurement gaps specified by the MG configuration.

In some aspects, transmitting PRS modification information to the network entity comprises transmitting PRS measurement results.

In some aspects, the at least one processor is further configured to: receive, from the network entity, an updated PRS configuration; and perform a PRS measurement using the updated PRS configuration.

In some aspects, the PRS modification information is transmitted via radio resource control (RRC), long term evolution (LTE) positioning protocol (LPP), medium access control (MAC) control element (MAC-CE), or downlink control information (DCI).

In some aspects, the PRS modification information comprises a request to modify the PRS configuration.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In an aspect, a network entity includes a memory; at least one network interface; and at least one processor communicatively coupled to the memory and the at least one network interface, the at least one processor configured to: cause the at least one network interface to transmit, to a user equipment (UE), a positioning reference signal (PRS) configuration; receive, from the UE, PRS modification information; update the PRS configuration for the UE based on the PRS modification information; and cause the at least one network interface to transmit, to the UE, the updated PRS configuration.

In some aspects, the network comprises a location server, a location management function, or a transmission/reception point.

In some aspects, the PRS modification information is received via radio resource control (RRC), long term evolution (LTE) positioning protocol (LPP), medium access control (MAC) control element (MAC-CE), or downlink control information (DCI).

In some aspects, the PRS modification information comprises a request modify the PRS configuration.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the at least one processor is further configured to: receive, from the UE, a report comprising one or more measurements of one or more non-serving base stations performed by the UE during measurement gaps specified by a MG configuration.

In an aspect, a base station includes a memory; at least one transceiver; and at least one processor communicatively coupled to the memory and the at least one transceiver, the at least one processor configured to: receive, from a user equipment (UE), positioning reference signal (PRS) modification information; and transmit to a network entity, the PRS modification information.

In some aspects, the PRS modification information is received or transmitted via radio resource control (RRC), long term evolution (LTE) positioning protocol (LPP), medium access control (MAC) control element (MAC-CE), or downlink control information (DCI).

In an aspect, a user equipment (UE) includes means for receiving, from a network entity, a positioning reference signal (PRS) configuration; means for receiving, from a serving base station, a measurement gap (MG) configuration; means for determining that one or more transmission properties of one or more resources should be modified; and means for transmitting PRS modification information to the network entity, based on the one or more transmission properties of one or more PRS resources to be modified.

In an aspect, a network entity includes means for transmitting, to a user equipment (UE), a positioning reference signal (PRS) configuration; means for receiving, from the UE, PRS modification information; means for updating the PRS configuration for the UE based on the PRS modification information; and means for transmitting, to the UE, the updated PRS configuration.

In an aspect, a base station includes means for receiving, from a user equipment (UE), positioning reference signal (PRS) modification information; and means for transmitting to a network entity, the PRS modification information.

In an aspect, a non-transitory computer-readable medium storing computer-executable instructions includes at least one instruction instructing a user equipment (UE) to receive, from a network entity, a positioning reference signal (PRS) configuration; at least one instruction instructing the UE to receive, from a serving base station, a measurement gap (MG) configuration; at least one instruction instructing the UE to determine that one or more transmission properties of one or more resources should be modified; and at least one instruction instructing the UE to transmit PRS modification information to the network entity, based on the one or more transmission properties of one or more PRS resources to be modified.

In an aspect, a non-transitory computer-readable medium storing computer-executable instructions includes at least one instruction instructing a network entity to transmit, to a user equipment (UE), a positioning reference signal (PRS) configuration; at least one instruction instructing the network entity to receive, from the UE, PRS modification information; at least one instruction instructing the network entity to update the PRS configuration for the UE based on the PRS modification information; and at least one instruction instructing the network entity to transmit, to the UE, the updated PRS configuration.

In an aspect, a non-transitory computer-readable medium storing computer-executable instructions includes at least one instruction instructing a base station (BS) to receive, from a user equipment (UE), positioning reference signal (PRS) modification information; and at least one instruction instructing the BS to transmit to a network entity, the PRS modification information.

The following are additional aspects:

In an aspect, a method of wireless communication performed by a user equipment (UE) includes receiving, from a network entity, a positioning reference signal (PRS) configuration; receiving, from a serving base station, a measurement gap (MG) configuration; determining that one or more transmission properties of one or more PRS resources should be modified; and transmitting PRS modification information to the network entity, based on the one or more transmission properties of one or more PRS resources to be modified.

In some aspects, the network entity comprises a location server, a location management function, or a transmission/reception point.

In some aspects, the method further comprises, prior to determining that one or more transmission properties of one or more resources should be modified, performing a PRS measurement on the one or more PRS resources.

In some aspects, performing a PRS measurement comprises performing PRS measurements of one or more transmission/reception points (TRPs) during measurement gaps specified by the MG configuration.

In some aspects, transmitting PRS modification information to the network entity comprises transmitting PRS measurement results.

In some aspects, the PRS measurement results comprise a reference signal received power (RSRP) value, a reference signal time difference (RSTD) value, a reception to transmission (Rx-Tx) value, or a combination thereof.

In some aspects, the method includes receiving, from the network entity, an updated PRS configuration; and performing a PRS measurement using the updated PRS configuration.

In some aspects, the PRS modification information is transmitted via radio resource control (RRC), long term evolution (LTE) positioning protocol (LPP), medium access control (MAC) control element (MAC-CE), or downlink control information (DCI), or a combination thereof.

In some aspects, the PRS modification information comprises a request to modify the PRS configuration.

In some aspects, the request to modify the PRS configuration comprises a request to cancel or remove PRS instances that are not within a measurement gap.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the PRS modification information indicates a start time, a stop time, a duration, or a combination thereof, associated with the modification to the PRS configuration.

In an aspect, a method of wireless communication performed by a network entity includes transmitting, to a user equipment (UE), a positioning reference signal (PRS) configuration; receiving, from the UE, PRS modification information; updating the PRS configuration for the UE based on the PRS modification information; and transmitting, to the UE, the updated PRS configuration.

In some aspects, the network entity comprises a location server, a location management function, or a transmission/reception point.

In some aspects, the PRS modification information is received via radio resource control (RRC), long term evolution (LTE) positioning protocol (LPP), medium access control (MAC) control element (MAC-CE), or downlink control information (DCI), or a combination thereof.

In some aspects, the PRS modification information comprises a request modify the PRS configuration.

In some aspects, receiving the PRS modification information comprises receiving PRS measurement results.

In some aspects, the PRS measurement results comprise a reference signal received power (RSRP) value, a reference signal time difference (RSTD) value, a reception to transmission (Rx-Tx) value, or a combination thereof.

In some aspects, the request to modify the PRS configuration comprises a request to cancel or remove PRS instances that are not within a measurement gap.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the PRS modification information indicates a start time, a stop time, a duration, or a combination thereof, for the modification to the PRS configuration.

In some aspects, the method includes receiving, from the UE, a report comprising one or more measurements of one or more non-serving base stations performed by the UE during measurement gaps specified by a MG configuration.

In an aspect, a method of wireless communication performed by a base station includes receiving, from a user equipment (UE), positioning reference signal (PRS) modification information; and transmitting, to a network entity, the PRS modification information.

In some aspects, the network entity comprises a location server, a location management function, or a transmission/reception point.

In some aspects, the PRS modification information is received or transmitted via radio resource control (RRC), long term evolution (LTE) positioning protocol (LPP), medium access control (MAC) control element (MAC-CE), or downlink control information (DCI), or a combination thereof.

In an aspect, a user equipment (UE) includes a memory; at least one transceiver; and at least one processor communicatively coupled to the memory and the at least one transceiver, the at least one processor configured to: receive, from a network entity, a positioning reference signal (PRS) configuration; receive, from a serving base station, a measurement gap (MG) configuration; determine that one or more transmission properties of one or more PRS resources should be modified; and cause the at least one transceiver to transmit PRS modification information to the network entity, based on the one or more transmission properties of one or more PRS resources to be modified.

In some aspects, the network entity comprises a location server, a location management function, or a transmission/reception point.

In some aspects, the at least one processor is further configured to, prior to determining that one or more transmission properties of one or more resources should be modified, performing a PRS measurement.

In some aspects, performing a PRS measurement comprises performing PRS measurements of one or more non-serving base stations performed by the UE during measurement gaps specified by the MG configuration.

In some aspects, transmitting PRS modification information to the network entity comprises transmitting PRS measurement results.

In some aspects, the PRS measurement results comprise a reference signal received power (RSRP) value, a reference signal time difference (RSTD) value, a reception to transmission (Rx-Tx) value, or a combination thereof.

In some aspects, the at least one processor is further configured to: receive, from the network entity, an updated PRS configuration; and perform a PRS measurement using the updated PRS configuration.

In some aspects, the PRS modification information is transmitted via radio resource control (RRC), long term evolution (LTE) positioning protocol (LPP), medium access control (MAC) control element (MAC-CE), or downlink control information (DCI), or a combination thereof.

In some aspects, the PRS modification information comprises a request to modify the PRS configuration.

In some aspects, the request to modify the PRS configuration comprises a request to cancel or remove PRS instances that are not within a measurement gap.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the PRS modification information indicates a start time, a stop time, a duration, or a combination thereof, associated with the modification to the PRS configuration.

In an aspect, a network entity includes a memory; at least one network interface; and at least one processor communicatively coupled to the memory and the at least one network interface, the at least one processor configured to: cause the at least one network interface to transmit, to a user equipment (UE), a positioning reference signal (PRS) configuration; receive, from the UE, PRS modification information; update the PRS configuration for the UE based on the PRS modification information; and cause the at least one network interface to transmit, to the UE, the updated PRS configuration.

In some aspects, the network entity comprises a location server, a location management function, or a transmission/reception point.

In some aspects, the PRS modification information is received via radio resource control (RRC), long term evolution (LTE) positioning protocol (LPP), medium access control (MAC) control element (MAC-CE), or downlink control information (DCI), or a combination thereof.

In some aspects, the PRS modification information comprises a request modify the PRS configuration.

In some aspects, receiving the PRS modification information comprises receiving PRS measurement results.

In some aspects, the PRS measurement results comprise a reference signal received power (RSRP) value, a reference signal time difference (RSTD) value, a reception to transmission (Rx-Tx) value, or a combination thereof.

In some aspects, the request to modify the PRS configuration comprises a request to cancel or remove PRS instances that are not within a measurement gap.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the PRS modification information indicates a start time, a stop time, a duration, or a combination thereof, for the modification to the PRS configuration.

In some aspects, the at least one processor is further configured to: receive, from the UE, a report comprising one or more measurements of one or more non-serving base stations performed by the UE during measurement gaps specified by a MG configuration.

In an aspect, a base station includes a memory; at least one transceiver; and at least one processor communicatively coupled to the memory and the at least one transceiver, the at least one processor configured to: receive, from a user equipment (UE), positioning reference signal (PRS) modification information; and transmit to a network entity, the PRS modification information.

In some aspects, the network entity comprises a location server, a location management function, or a transmission/reception point.

In some aspects, the PRS modification information is received or transmitted via radio resource control (RRC), long term evolution (LTE) positioning protocol (LPP), medium access control (MAC) control element (MAC-CE), or downlink control information (DCI).

In an aspect, a user equipment (UE) includes means for receiving, from a network entity, a positioning reference signal (PRS) configuration; means for receiving, from a serving base station, a measurement gap (MG) configuration; means for determining that one or more transmission properties of one or more PRS resources should be modified; and means for transmitting PRS modification information to the network entity, based on the one or more transmission properties of one or more PRS resources to be modified.

In some aspects, the network entity comprises a location server, a location management function, or a transmission/reception point.

In some aspects, the method further comprises, prior to determining that one or more transmission properties of one or more resources should be modified, performing a PRS measurement on the one or more PRS resources.

In some aspects, the means for performing a PRS measurement comprises means for performing PRS measurements of one or more transmission/reception points (TRPs) during measurement gaps specified by the MG configuration.

In some aspects, the means for transmitting PRS modification information to the network entity comprises means for transmitting PRS measurement results.

In some aspects, the PRS measurement results comprise a reference signal received power (RSRP) value, a reference signal time difference (RSTD) value, a reception to transmission (Rx-Tx) value, or a combination thereof.

In some aspects, the method includes means for receiving, from the network entity, an updated PRS configuration; and means for performing a PRS measurement using the updated PRS configuration.

In some aspects, the PRS modification information is transmitted via radio resource control (RRC), long term evolution (LTE) positioning protocol (LPP), medium access control (MAC) control element (MAC-CE), or downlink control information (DCI), or a combination thereof.

In some aspects, the PRS modification information comprises a request to modify the PRS configuration.

In some aspects, the request to modify the PRS configuration comprises a request to cancel or remove PRS instances that are not within a measurement gap.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the PRS modification information indicates a start time, a stop time, a duration, or a combination thereof, associated with the modification to the PRS configuration.

In an aspect, a network entity includes means for transmitting, to a user equipment (UE), a positioning reference signal (PRS) configuration; means for receiving, from the UE, PRS modification information; means for updating the PRS configuration for the UE based on the PRS modification information; and means for transmitting, to the UE, the updated PRS configuration.

In some aspects, the network entity comprises a location server, a location management function, or a transmission/reception point.

In some aspects, the PRS modification information is received via radio resource control (RRC), long term evolution (LTE) positioning protocol (LPP), medium access control (MAC) control element (MAC-CE), or downlink control information (DCI), or a combination thereof.

In some aspects, the PRS modification information comprises a request modify the PRS configuration.

In some aspects, the means for receiving the PRS modification information comprises means for receiving PRS measurement results.

In some aspects, the PRS measurement results comprise a reference signal received power (RSRP) value, a reference signal time difference (RSTD) value, a reception to transmission (Rx-Tx) value, or a combination thereof.

In some aspects, the request to modify the PRS configuration comprises a request to cancel or remove PRS instances that are not within a measurement gap.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the PRS modification information indicates a start time, a stop time, a duration, or a combination thereof, for the modification to the PRS configuration.

In an aspect, a base station (BS) includes means for receiving, from a user equipment (UE), positioning reference signal (PRS) modification information; and means for transmitting, to a network entity, the PRS modification information.

In some aspects, the network entity comprises a location server, a location management function, or a transmission/reception point.

In some aspects, the PRS modification information is received or transmitted via radio resource control (RRC), long term evolution (LTE) positioning protocol (LPP), medium access control (MAC) control element (MAC-CE), or downlink control information (DCI), or a combination thereof.

In an aspect, a non-transitory computer-readable medium storing computer-executable instructions that, when executed by a user equipment (UE), cause the UE to: receive, from a network entity, a positioning reference signal (PRS) configuration; receive, from a serving base station, a measurement gap (MG) configuration; determine that one or more transmission properties of one or more PRS resources should be modified; and transmit PRS modification information to the network entity, based on the one or more transmission properties of one or more PRS resources to be modified.

In some aspects, the network entity comprises a location server, a location management function, or a transmission/reception point.

In some aspects, the method further comprises, prior to determining that one or more transmission properties of one or more resources should be modified, performing a PRS measurement on the one or more PRS resources.

In some aspects, the computer-executable instructions that, when executed, cause the UE to perform a PRS measurement comprise computer-executable instructions that, when executed, cause the UE to perform PRS measurements of one or more transmission/reception points (TRPs) during measurement gaps specified by the MG configuration.

In some aspects, the computer-executable instructions that, when executed, cause the UE to transmit PRS modification information to the network entity comprise computer-executable instructions that, when executed, cause the UE to transmit PRS measurement results.

In some aspects, the PRS measurement results comprise a reference signal received power (RSRP) value, a reference signal time difference (RSTD) value, a reception to transmission (Rx-Tx) value, or a combination thereof.

In some aspects, the one or more instructions further cause the UE to: receive, from the network entity, an updated PRS configuration; and perform a PRS measurement using the updated PRS configuration.

In some aspects, the PRS modification information is transmitted via radio resource control (RRC), long term evolution (LTE) positioning protocol (LPP), medium access control (MAC) control element (MAC-CE), or downlink control information (DCI), or a combination thereof.

In some aspects, the PRS modification information comprises a request to modify the PRS configuration.

In some aspects, the request to modify the PRS configuration comprises a request to cancel or remove PRS instances that are not within a measurement gap.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the PRS modification information indicates a start time, a stop time, a duration, or a combination thereof, associated with the modification to the PRS configuration.

In an aspect, a non-transitory computer-readable medium storing computer-executable instructions that, when executed by a network entity, cause the network entity to: transmit, to a user equipment (UE), a positioning reference signal (PRS) configuration; receive, from the UE, PRS modification information; update the PRS configuration for the UE based on the PRS modification information; and transmit, to the UE, the updated PRS configuration.

In some aspects, the network entity comprises a location server, a location management function, or a transmission/reception point.

In some aspects, the PRS modification information is received via radio resource control (RRC), long term evolution (LTE) positioning protocol (LPP), medium access control (MAC) control element (MAC-CE), or downlink control information (DCI), or a combination thereof.

In some aspects, the PRS modification information comprises a request modify the PRS configuration.

In some aspects, the computer-executable instructions that, when executed, cause the network entity to receive the PRS modification information comprise computer-executable instructions that, when executed, cause the network entity to receive PRS measurement results.

In some aspects, the PRS measurement results comprise a reference signal received power (RSRP) value, a reference signal time difference (RSTD) value, a reception to transmission (Rx-Tx) value, or a combination thereof.

In some aspects, the request to modify the PRS configuration comprises a request to cancel or remove PRS instances that are not within a measurement gap.

In some aspects, the request to modify the PRS configuration comprises a request to cancel, or remove, or reduce overhead of, one or more PRS resource sets, one or more PRS resources in the one or more PRS resource sets, one or more PRS instances of the one or more PRS resources, and/or one or more repetitions of PRS instances.

In some aspects, the request to modify the PRS configuration comprises a request to cancel, or remove, PRS resources of one or more frequency layers, one or more transmission/reception points of a frequency layer, one or more frequency layers of one or more transmission/reception points, and/or PRS resources associated with specific repetitions of the above.

In some aspects, the PRS modification information indicates a start time, a stop time, a duration, or a combination thereof, for the modification to the PRS configuration.

In an aspect, a non-transitory computer-readable medium storing computer-executable instructions that, when executed by a base station (BS), cause the BS to: receive, from a user equipment (UE), positioning reference signal (PRS) modification information; and transmit, to a network entity, the PRS modification information.

In some aspects, the network entity comprises a location server, a location management function, or a transmission/reception point.

In some aspects, the PRS modification information is received or transmitted via radio resource control (RRC), long term evolution (LTE) positioning protocol (LPP), medium access control (MAC) control element (MAC-CE), or downlink control information (DCI), or a combination thereof.

Other objects and advantages associated with the aspects disclosed herein will be apparent to those skilled in the art based on the accompanying drawings and detailed description.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), the method comprising:
   receiving, from a network entity, a positioning reference signal (PRS) configuration;
   receiving, from a serving base station, a measurement gap (MG) configuration; and
   transmitting PRS modification information to the network entity, the PRS modification information requesting cancellation or removal of one or more PRS instances specified by the PRS configuration that are not within measurement gaps specified by the MG configuration.

2. The method of claim 1, wherein the network entity comprises a location server, a location management function, or a transmission/reception point.

3. The method of claim 1, further comprising:
   performing a PRS measurement operation on one or more PRS resources,
   wherein the PRS modification information further includes one or more modifications to one or more transmission properties of the one or more PRS resources based on the PRS measurement operation.

4. The method of claim 3, wherein the performing the PRS measurement operation comprises measuring PRS transmissions from one or more transmission/reception points (TRPs) during the measurement gaps specified by the MG configuration.

5. The method of claim 1, wherein the transmitting the PRS modification information to the network entity comprises transmitting PRS measurement results.

6. The method of claim 5, wherein the PRS measurement results comprise a reference signal received power (RSRP)

value, a reference signal time difference (RSTD) value, a reception to transmission (Rx-Tx) value, or a combination thereof.

7. The method of claim 1, further comprising:
receiving, from the network entity, an updated PRS configuration; and
performing a PRS measurement operation based on the updated PRS configuration.

8. The method of claim 1, wherein the transmitting the PRS modification information comprises transmitting the PRS modification information via radio resource control (RRC), long term evolution (LTE) positioning protocol (LPP), medium access control (MAC) control element (MAC-CE), downlink control information (DCI), or a combination thereof.

9. The method of claim 3, wherein the one or more modifications to the one or more transmission properties of the one or more PRS resources comprise cancellation, removal, or reduction of overhead of: one or more PRS resource sets, one or more PRS resources in the one or more PRS resource sets, one or more PRS instances of the one or more PRS resources, one or more repetitions of PRS instances, or a combination thereof.

10. The method of claim 3, wherein the one or more modifications to the one or more transmission properties of the one or more PRS resources comprise cancellation or removal of: PRS resources of one or more frequency layers, one or more transmission/reception points of a frequency layer, one or more frequency layers of one or more transmission/reception points, PRS resources associated with specific repetitions of one or more of the above, or a combination thereof.

11. The method of claim 1, wherein the transmitting the PRS modification information comprises transmitting information that indicates a start time, a stop time, a duration, or a combination thereof, associated with modifying the PRS configuration.

12. A method of wireless communication performed by a network entity, the method comprising:
transmitting, to a user equipment (UE), a positioning reference signal (PRS) configuration;
receiving, from the UE, PRS modification information, the PRS modification information requesting cancellation or removal of one or more PRS instances specified by the PRS configuration that are not within measurement gaps with which the UE is configured;
updating the PRS configuration for the UE based on the PRS modification information; and
transmitting, to the UE, the updated PRS configuration.

13. The method of claim 12, wherein the network entity comprises a location server, a location management function, or a transmission/reception point.

14. The method of claim 12, wherein the PRS modification information is received via radio resource control (RRC), long term evolution (LTE) positioning protocol (LPP), medium access control (MAC) control element (MAC-CE), or downlink control information (DCI), or a combination thereof.

15. The method of claim 12, wherein the PRS modification information comprises one or more modifications to one or more transmission properties of one or more PRS resources.

16. The method of claim 12, wherein the receiving the PRS modification information comprises receiving PRS measurement results.

17. The method of claim 16, wherein the PRS measurement results comprise a reference signal received power (RSRP) value, a reference signal time difference (RSTD) value, a reception to transmission (Rx-Tx) value, or a combination thereof.

18. The method of claim 15, wherein the one or more modifications to the one or more transmission properties of the one or more PRS resources comprise cancellation, removal, or reduction of overhead of: one or more PRS resource sets, one or more PRS resources in the one or more PRS resource sets, one or more PRS instances of the one or more PRS resources, one or more repetitions of PRS instances, or a combination thereof.

19. The method of claim 15, wherein the one or more modifications to the one or more transmission properties of the one or more PRS resources comprise cancellation or removal of: PRS resources of one or more frequency layers, one or more transmission/reception points of a frequency layer, one or more frequency layers of one or more transmission/reception points, PRS resources associated with specific repetitions of one or more of the above, or a combination thereof.

20. The method of claim 12, wherein the receiving the PRS modification information comprises receiving information that indicates a start time, a stop time, a duration, or a combination thereof, for modifying the PRS configuration.

21. The method of claim 12, further comprising:
receiving, from the UE, a report comprising results of one or more measurements of one or more non-serving base stations performed by the UE during the measurement gaps specified by a measurement gap (MG) configuration.

22. A user equipment (UE), comprising:
a memory;
at least one transceiver; and
at least one processor communicatively coupled to the memory and the at least one transceiver, the at least one processor configured to:
receive, from a network entity, a positioning reference signal (PRS) configuration;
receive, from a serving base station, a measurement gap (MG) configuration; and
cause the at least one transceiver to transmit PRS modification information to the network entity, the PRS modification information requesting cancellation or removal of one or more PRS instances specified by the PRS configuration that are not within measurement gaps specified by the MG configuration.

23. The UE of claim 22, wherein the network entity comprises a location server, a location management function, or a transmission/reception point.

24. The UE of claim 22, wherein the at least one processor is further configured to:
perform a PRS measurement operation on one or more PRS resources,
wherein the PRS modification information further includes one or more modifications to one or more transmission properties of the one or more PRS resources based on the PRS measurement operation.

25. The UE of claim 24, wherein the PRS measurement operation comprises measuring PRS transmissions from one or more non-serving base stations performed by the UE during the measurement gaps specified by the MG configuration.

26. The UE of claim 22, wherein the PRS modification information comprises PRS measurement results.

27. The UE of claim 26, wherein the PRS measurement results comprise a reference signal received power (RSRP)

value, a reference signal time difference (RSTD) value, a reception to transmission (Rx-Tx) value, or a combination thereof.

28. The UE of claim 22, wherein the at least one processor is further configured to:
receive, from the network entity, an updated PRS configuration; and
perform a PRS measurement operation based on using the updated PRS configuration.

29. The UE of claim 22, wherein the PRS modification information is transmitted via radio resource control (RRC), long term evolution (LTE) positioning protocol (LPP), medium access control (MAC) control element (MAC-CE), or downlink control information (DCI), or a combination thereof.

30. The UE of claim 24, wherein the one or more modifications to the one or more transmission properties of the one or more PRS resources comprise cancellation, removal, or reduction of overhead of: one or more PRS resource sets, one or more PRS resources in the one or more PRS resource sets, one or more PRS instances of the one or more PRS resources, one or more repetitions of PRS instances, or a combination thereof.

31. The UE of claim 27, wherein the one or more modifications to the one or more transmission properties of the one or more PRS resources comprise cancellation or removal of: PRS resources of one or more frequency layers, one or more transmission/reception points of a frequency layer, one or more frequency layers of one or more transmission/reception points, PRS resources associated with specific repetitions of the above, or a combination thereof.

32. The UE of claim 22, wherein the PRS modification information indicates a start time, a stop time, a duration, or a combination thereof, associated with modifying the PRS configuration.

33. A network entity, comprising:
a memory;
at least one network interface; and
at least one processor communicatively coupled to the memory and the at least one network interface, the at least one processor configured to:
cause the at least one network interface to transmit, to a user equipment (UE), a positioning reference signal (PRS) configuration;
receive, from the UE, PRS modification information, the PRS modification information requesting cancellation or removal of one or more PRS instances specified by the PRS configuration that are not within measurement gaps with which the UE is configured;
update the PRS configuration for the UE based on the PRS modification information; and
cause the at least one network interface to transmit, to the UE, the updated PRS configuration.

34. The network entity of claim 33, comprising a location server, a location management function, or a transmission/reception point.

35. The network entity of claim 33, wherein the PRS modification information is received via radio resource control (RRC), long term evolution (LTE) positioning protocol (LPP), medium access control (MAC) control element (MAC-CE), or downlink control information (DCI), or a combination thereof.

36. The network entity of claim 33, wherein the PRS modification information comprises one or more modifications to one or more transmission properties of one or more PRS resources.

37. The network entity of claim 36, wherein the PRS modification information comprises PRS measurement results.

38. The network entity of claim 37, wherein the PRS measurement results comprise a reference signal received power (RSRP) value, a reference signal time difference (RSTD) value, a reception to transmission (Rx-Tx) value, or a combination thereof.

39. The network entity of claim 36, wherein the one or more modifications to the one or more transmission properties of the one or more PRS resources comprise cancellation, removal, or reduction of overhead of: one or more PRS resource sets, one or more PRS resources in the one or more PRS resource sets, one or more PRS instances of the one or more PRS resources, one or more repetitions of PRS instances, or a combination thereof.

40. The network entity of claim 36, wherein the one or more modifications to the one or more transmission properties of the one or more PRS resources comprise cancellation or removal of: PRS resources of one or more frequency layers, one or more transmission/reception points of a frequency layer, one or more frequency layers of one or more transmission/reception points, PRS resources associated with specific repetitions of the above, or a combination thereof.

41. The network entity of claim 33, wherein the PRS modification information indicates a start time, a stop time, a duration, or a combination thereof, for modifying the PRS configuration.

42. The network entity of claim 33, wherein the at least one processor is further configured to:
receive, from the UE, a report comprising results of one or more measurements of one or more non-serving base stations performed by the UE during the measurement gaps specified by a measurement gap (MG) configuration.

* * * * *